(12) United States Patent
Arsenault et al.

(10) Patent No.: US 7,661,119 B1
(45) Date of Patent: Feb. 9, 2010

(54) METHOD AND APPARATUS FOR PROVIDING NON-RESIDENT PROGRAM GUIDE INFORMATION TO A MEDIA SUBSCRIBER

(75) Inventors: Robert G. Arsenault, Redondo Beach, CA (US); Stephen P. Dulac, Santa Clarita, CA (US); Tam T. Leminh, Cypress, CA (US); Laura J. O'Donnell, El Segundo, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 2053 days.

(21) Appl. No.: 09/677,691

(22) Filed: Oct. 2, 2000

(51) Int. Cl.
H04N 5/445 (2006.01)
(52) U.S. Cl. .............................. 725/48; 725/50; 725/53; 709/217; 370/261; 348/461
(58) Field of Classification Search ............. 725/37–61; 348/6, 7, 10, 13, 461, 906; 709/203, 217, 709/220, 229; 370/261, 262
See application file for complete search history.

(56) References Cited

U.S. PATENT DOCUMENTS

| 4,768,229 | A |  | 8/1988 | Benjamin et al. |
| 5,515,106 | A | * | 5/1996 | Chaney et al. ................ 725/48 |
| 5,550,576 | A |  | 8/1996 | Klosterman |
| 5,559,548 | A |  | 9/1996 | Davis et al. |
| 5,579,055 | A | * | 11/1996 | Hamilton et al. ............... 725/49 |
| 5,619,274 | A |  | 4/1997 | Roop et al. |
| 5,625,406 | A |  | 4/1997 | Newberry et al. |
| 5,642,153 | A |  | 6/1997 | Chaney et al. |
| 5,666,645 | A | * | 9/1997 | Thomas et al. ................ 725/47 |
| 5,668,805 | A |  | 9/1997 | Yoshinobu |
| 5,734,589 | A |  | 3/1998 | Kostreski et al. |

(Continued)

FOREIGN PATENT DOCUMENTS

WO    WO 97/18673    5/1997

OTHER PUBLICATIONS

Michael Robin et al., *Digital Television Fundamentals—Design And Installation of Video And Audio Systems*, McGraw-Hill, Chapter 8, title page(s) and pp. 345-425.

(Continued)

*Primary Examiner*—Annan Q Shang

(57) ABSTRACT

A system and method for providing program guide information to subscribers is disclosed. In one embodiment, the method is applied to a satellite broadcasting system having a first satellite broadcasting a first signal having a first set of program material and first program guide information describing at least a portion of said set of program material, and a second satellite broadcasting a second signal having a second set of program material and second program guide information describing at least a portion of said second set of program material, wherein the first broadcast signal and the second broadcast signal each include service channels uniquely described by a service channel identifier. The method comprises the steps of mapping at least a portion of the first program guide information to a first service channel of the first broadcast signal; mapping at least a portion of the second program guide information to a second service channel of the first broadcast signal, wherein the second service channel is logically offset from the first service channel; and transmitting the first signal to the subscriber.

42 Claims, 18 Drawing Sheets

U.S. PATENT DOCUMENTS

| | | | |
|---|---|---|---|
| 5,760,821 | A | 6/1998 | Ellis et al. |
| 5,801,753 | A * | 9/1998 | Eyer et al. .................... 725/50 |
| 5,860,056 | A | 1/1999 | Pond |
| 5,867,207 | A | 2/1999 | Chaney et al. |
| 5,883,677 | A * | 3/1999 | Hofmann .................... 348/584 |
| 5,917,481 | A | 6/1999 | Rzeszewski et al. |
| 5,923,362 | A | 7/1999 | Klosterman |
| 5,966,638 | A | 10/1999 | Mita et al. |
| 6,003,041 | A | 12/1999 | Wugofski |
| 6,006,662 | A * | 12/1999 | Ishida et al. ................ 101/141 |
| 6,008,803 | A * | 12/1999 | Rowe et al. ................. 715/721 |
| 6,064,378 | A | 5/2000 | Chaney et al. |
| 6,072,983 | A * | 6/2000 | Klosterman .................. 725/49 |
| 6,163,316 | A | 12/2000 | Killian |
| 6,216,264 | B1 | 4/2001 | Maze et al. |
| 6,314,571 | B1 * | 11/2001 | Ogawa et al. ................. 725/48 |
| 6,314,572 | B1 | 11/2001 | LaRocca et al. |
| 6,401,242 | B1 * | 6/2002 | Eyer et al. .................... 725/35 |
| 6,405,372 | B1 | 6/2002 | Kim et al. |
| 6,418,556 | B1 | 7/2002 | Bennington et al. |
| 6,460,180 | B1 * | 10/2002 | Park et al. .................... 725/40 |
| 6,463,586 | B1 * | 10/2002 | Jerding ........................ 725/37 |
| 6,493,876 | B1 | 12/2002 | DeFreese et al. |
| 6,505,347 | B1 | 1/2003 | Kaneko et al. |
| 6,522,342 | B1 * | 2/2003 | Gagnon et al. .............. 715/716 |
| 6,583,825 | B1 | 6/2003 | Yuen et al. |
| 6,658,661 | B1 | 12/2003 | Arsenault et al. |
| 6,678,733 | B1 | 1/2004 | Brown et al. |
| 6,732,370 | B1 * | 5/2004 | Gordon et al. ................ 725/39 |
| 6,754,905 | B2 | 6/2004 | Gordon et al. |
| 6,772,434 | B1 * | 8/2004 | Godwin ....................... 725/68 |
| 6,792,615 | B1 | 9/2004 | Rowe et al. |
| 6,904,610 | B1 * | 6/2005 | Bayrakeri et al. ............. 725/54 |
| 6,922,844 | B1 | 7/2005 | Arsenault et al. |
| 6,970,564 | B1 | 11/2005 | Kubota et al. |
| 6,990,678 | B2 * | 1/2006 | Zigmond ..................... 725/51 |
| 7,024,676 | B1 * | 4/2006 | Klopfenstein ................ 725/49 |
| 7,373,652 | B1 * | 5/2008 | Bayrakeri et al. ............. 725/53 |
| 2002/0007489 | A1 | 1/2002 | Jeong et al. |
| 2004/0068541 | A1 | 4/2004 | Bayassi et al. |

OTHER PUBLICATIONS

Non-final Office Action dated Jun. 10, 2008 in U.S. Appl. No. 09/651,706, filed Aug. 31, 2000 by Robert G. Arsenault et al.

Final Rejection dated Dec. 16, 2008 in U.S. Appl. No. 09/651,706, filed Aug. 31, 2000 by Robert G. Arsenault et al.

* cited by examiner

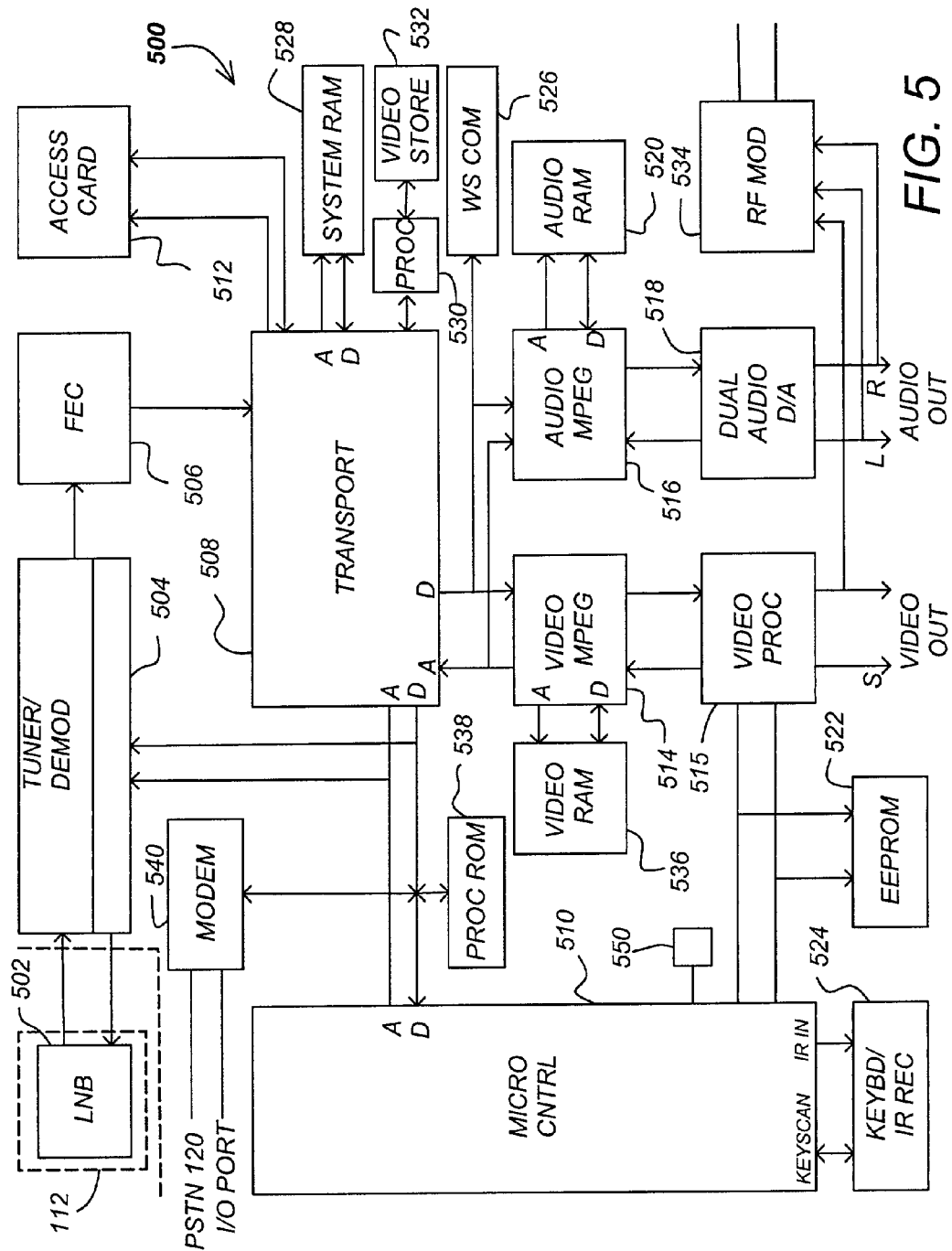

| SCID | Network 0 (Legacy) | Network 1 (Enhanced 1) | Network 2 (Enhanced 2) | Network 3 (Enhanced 3) |
|---|---|---|---|---|
| 1 | Legacy MPG | Legacy MPG | Legacy MPG | Legacy MPG |
| 2 | CAP | CAP | CAP | CAP |
| 3 | PIP | PIP | PIP | PIP |
| 4 | Legacy MPG's DIP | Legacy MPG's DIP | Legacy MPG's DIP | Legacy MPG's DIP |
| 5 | SPG | SPG | SPG | SPG |
| 6 | -- | -- | -- | -- |
| 7 | -- | -- | -- | -- |
| 8 | Tailored and Market MPGs' DIP | -- | Tailored and Market MPGs' DIP | Tailored and Market MPGs' DIP |
| 9 | Tailored MPG | -- | Unified MPG (Network 2 &3) | Unified MPG (Network 2 & 3) |
| 10 ... 0x4FF | video/ audio/ data | video/ audio/ data | video/ audio/ data | video/ audio/ data |
| 0x500 | BARP/ announce | -- | -- | -- |
| 0x501 | WINK | WINK | WINK | WINK |
| 0x502 | -- | -- | Foreign MPG (Tailored MPG from Network 0) | Foreign MPG (Tailored MPG from Network 0) |
| 0x504 | -- | -- | -- | -- |
| 0x505 | Foreign MPG (Unified MPG from Networks 2 & 3) | -- | -- | -- |
| 0x506 | -- | -- | -- | -- |
| 0x507 | -- | -- | -- | -- |
| 0x508 | -- | -- | -- | -- |
| 0x509 | -- | -- | -- | -- |
| 0x50A | Market 1 MPG | Market 1 MPG | Market 1 MPG | Market 1 MPG |
| 0x50B ... 0x522 | Market 2 MPG ... Market 25 MPG | Market 2 MPG ... Market 25 MPG | Market 2 MPG ... Market 25 MPG | Market 2 MPG ... Market 25 MPG |
| ... | -- | -- | -- | -- |
| 0x609 | -- | -- | -- | -- |
| TBD1 | SPG | SPG | SPG | SPG |

FIG. 7

METHOD AND APPARATUS FOR PROVIDING NON-RESIDENT PROGRAM GUIDE INFORMATION TO A MEDIA SUBSCRIBER

CROSS-REFERENCE TO RELATED APPLICATIONS

This application is related to the following co-pending and commonly assigned patent application, all of which applications are incorporated by reference herein:

Application Ser. No. 09/651,706, entitled "METHOD AND APPARATUS FOR INDICATING ERRONEOUS RECEPTION OF A SATELLITE SIGNAL," filed on Aug. 31, 2000, by Robert G. Arsenault, Stephen P. Dulac, Tam T. Leminh, and Laura O'Donnell;

Application Ser. No. 09/676,889, entitled "METHOD AND APPARATUS FOR PROVIDING UNIFIED PROGRAM GUIDE INFORMATION TO A MEDIA SUBSCRIBER," filed Oct. 22, 2000, by Robert G. Arsenault, Stephen P. Dulac, Tam T. Leminh, and Laura O'Donnell;

Application Ser. No. 09/677,565, entitled "METHOD AND APPARATUS FOR DISTINGUISHING PROGRAM GUIDES ACCORDING TO ORIGINATING NETWORK," filed Oct. 22, 2000, by Robert G. Arsenault, Stephen P. Dulac, Tam T. Leminh, and Laura O'Donnell; and Application Ser. No. 09/678,441, entitled "METHOD AND APPARATUS FOR ADAPTING PROGRAM GUIDES TO MEET SUBSCRIBER CRITERIA," filed Oct. 22, 2000, by Robert G. Arsenault, Stephen P. Dulac, Tam T. Leminh, and Laura O'Donnell.

BACKGROUND OF THE INVENTION

1. Field of the Invention

The preferred embodiment relates to systems and methods for providing video program material to subscribers, and in particular to a method and system for providing extended program guides to subscribers.

2. Description of the Related Art

Television programs are distributed to viewers by a variety of broadcasting methods. These methods include traditional analog broadcast television (National Television Systems Committee or "NTSC" standard), the upcoming digital broadcast television (Advanced Television Systems Committee or "ATSC" standard), cable television (both analog and digital), satellite broadcasting (both analog and digital), as well as other methods. These methods allow channels of television content to be multiplexed and transmitted over a common transmission medium.

In recent years, there has been an increasing demand for video distribution systems to provide more program channels. In digital satellite systems, this may be accomplished in many ways. One way of increasing the number of available channels is to increase the compression or decrease the error correction provided in the broadcast signal of existing satellites. Another way of increasing the number of available channels is to increase the bandwidth of the downlink from the satellite to the subscribers' receivers. Unfortunately, this technique is difficult to accomplish with existing (legacy) satellites and in a way that is compatible with existing (legacy) receivers.

As a result, video distribution systems have evolved to include additional satellites to broadcast additional program material to subscribers. Typically, satellites broadcasting these enhanced services are deployed in geosynchronous orbits in orbital locations proximate to those of the legacy satellites. This allows a single antenna to receive signals from both satellites with little or no physical scanning.

Electronic program guides for television programming are known in the art. Such program guides typically include a viewer channel number that identifies the stream of television content offered by a content provider and a description of each media program associated with the channel number. Program guide information is typically transmitted along with the television content, and typically also includes schedule information for display on users' televisions. The schedule information informs users what television programs are currently on, and what television programs will be shown in the near future.

Providing electronic program guides for the additional viewer channels carried by the multiple satellite video distribution system has become problematic. Typically, each satellite used in such systems transmits program guide information describing only those viewer channels carried by the satellite, and do so at regular and frequent intervals (e.g. every 5 seconds). This allows a new subscriber to receive program guide information for the satellite they are tuned to within a short period of time after setting up and activating the receiver station. However this has its disadvantages. Most notably, in multiple-satellite video distribution systems, when the subscriber requests program guide information regarding a viewer channel broadcast by a different satellite than the currently tuned viewer channel, the subscriber can experience a delay of several seconds before the next transmission of the program guide information is received and the information can be displayed.

For example, the system disclosed in U.S. Pat. Nos. 5,550,576 and 5,923,362, which are hereby incorporated by reference herein, disclose a system wherein a coordinator at the subscriber location collects program guide information from a number of sources and sorts and merges the program guide information into a single guide. However this solution requires multiple tuners to simultaneously receive program guide information from two separate satellites or the above-described delay will result when switching from one program source to another.

It is possible to simply repeat the program guide information from all satellites on one channel. Such a system is described in U.S. Pat. No. 6,072,983, which is hereby incorporated by reference herein. However, the system described in the '983 patent either requires additional downlink bandwidth or must extend the period of time between program guide updates. It also wastes bandwidth by presenting program guide information about viewer channels which are unreceivable by subscribers with legacy receivers.

What is needed is a method and apparatus to integrate program guide information for media programs broadcast by a plurality of satellites, and to provide such program guide information only to media subscribers who are capable of receiving the viewer channels described by the integrated program guide without wasting bandwidth or providing the program information on a delayed basis. The preferred embodiment satisfies that need.

SUMMARY OF THE INVENTION

In summary, the preferred embodiment describes a system and method for providing program guide information to subscribers. In one embodiment, the method is applied to a satellite broadcasting system having a first satellite broadcasting a first signal having a first set of program material and first program guide information describing at least a portion of said set of program material, and a second satellite broadcasting a second signal having a second set of program material and second program guide information describing at least a portion of said second set of program material, wherein the first broadcast signal and the second broadcast signal each include service channels uniquely described by a service channel identifier. The method comprises the steps of mapping at least a portion of the first program guide information to a first service channel of the first broadcast signal; mapping at least a portion of the second program guide information to a second service channel of the first broadcast signal, wherein the second service channel is logically offset from the first service channel; and transmitting the first signal to the subscriber.

The preferred embodiment is also described by an apparatus for providing program guide information to subscribers of the above-described satellite broadcasting system. In this embodiment, the apparatus comprises a tuner for receiving the first signal, and a presentation device for providing the first program guide information and the second program guide information to the subscriber. The first signal includes a first service channel having at least a portion of the first program guide information, a second service channel having at least a portion of the second program guide information, wherein the second service channel is logically offset from the first service channel, and a presentation device for providing the first program guide information and the second program guide information to the subscriber.

BRIEF DESCRIPTION OF THE DRAWINGS

Referring now to the drawings in which like reference numbers represent corresponding parts throughout:

FIG. 5 is a block diagram of one embodiment of an integrated receiver/decoder;

FIG. 7 is a diagram presenting a table of information broadcast on each service channel by the sources of the multi-source media program distribution system;

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
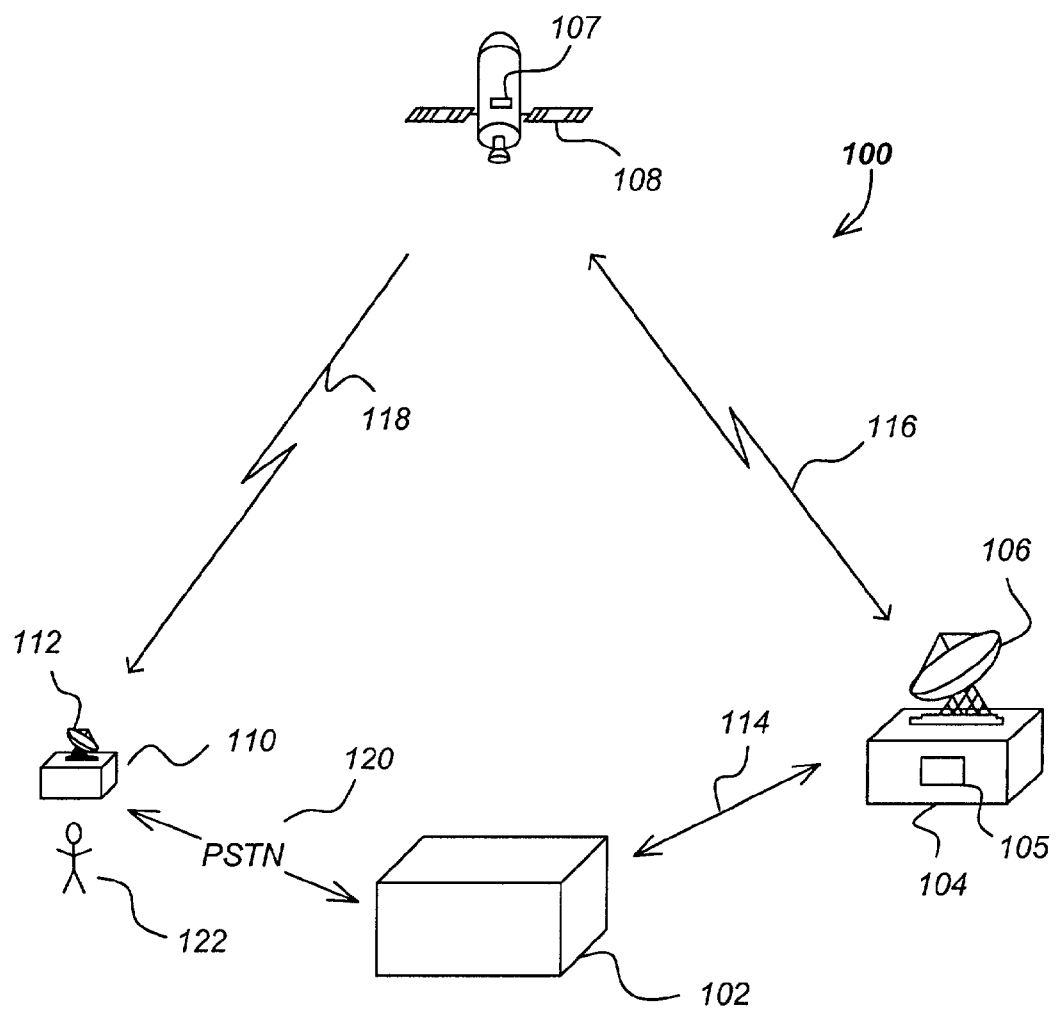
FIG. 1 is a diagram showing an overview of a video distribution system.

FIG. 1 is a diagram illustrating an overview of a single satellite video distribution system 100. The video distribution system 100 comprises a control center 102 in communication with an uplink center 104 via a ground or other link 114 and with a subscriber receiver station 110 via a public switched telephone network (PSTN) or other link 120. The control center 102 provides program material (e.g. video programs, audio programs and data) to the uplink center 104 and coordinates with the subscriber receiver stations 110 to offer, for example, pay-per-view (PPV) program services, including billing and associated decryption of video programs.

The uplink center receives program material and program control information from the control center 102, and using an uplink antenna 106 and transmitter 105, transmits the program material and program control information to the satellite 108. The satellite receives and processes this information, and transmits the video programs and control information to the subscriber receiver station 110 via downlink 118 using transmitter 107. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite based video distribution system 100, the preferred embodiment may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the preferred embodiment.

Although the foregoing has been described with respect to an embodiment in which the program material delivered to the subscriber 122 is video (and audio) program material such as a movie, the foregoing method can be used to deliver program material comprising purely audio information or other data as well.

Uplink Configuration

Figure 2:
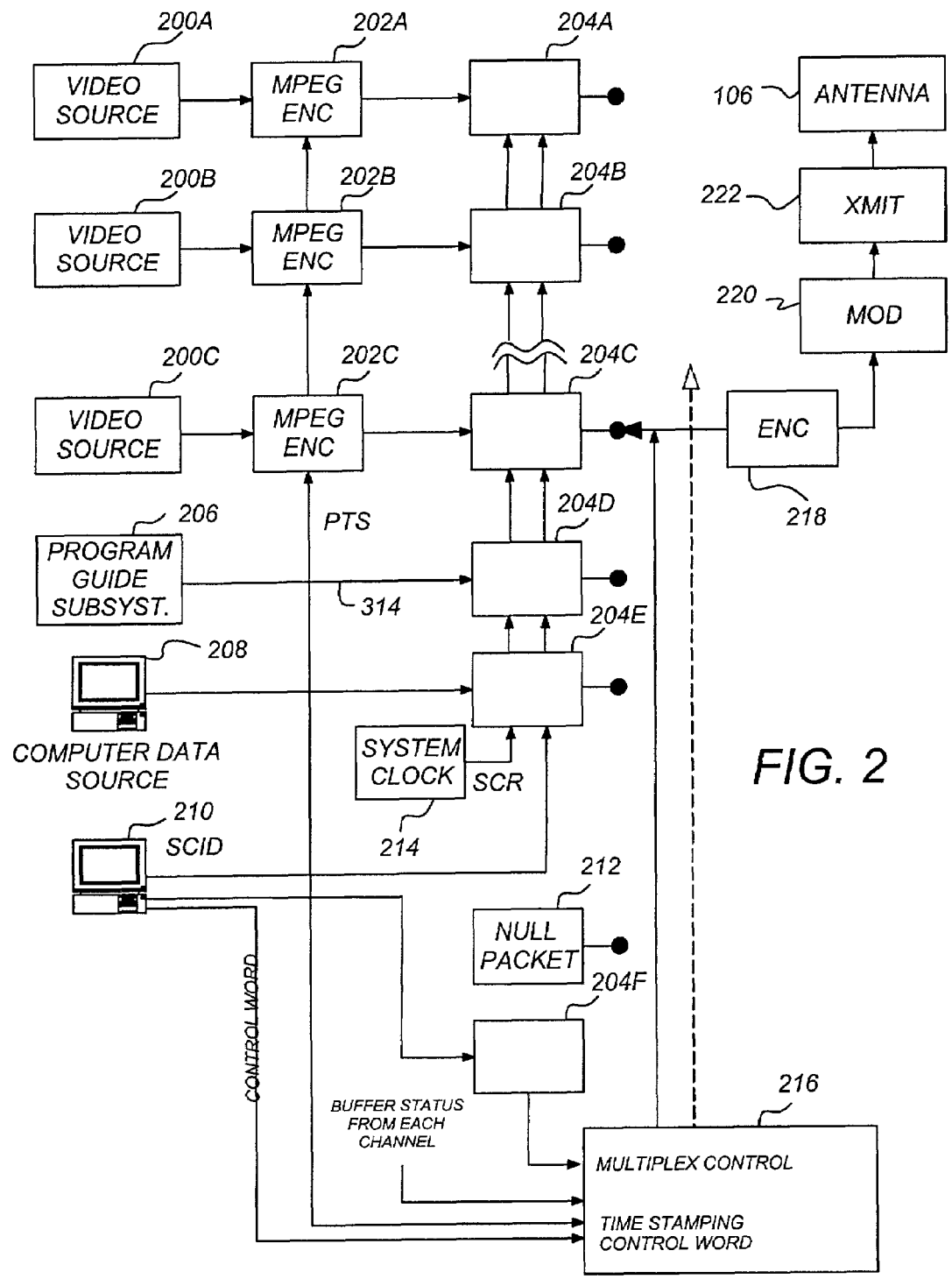
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a program guide subsystem 206 and computer data information from a computer data source 208.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200.

The data packets are assembled using a reference from the system clock 214 (SCR), and from the conditional access manager 210, which provides the SCID to the packetizers 204 for use in generating the data packets. These data packets are then multiplexed into serial data and transmitted.

Program Guide Subsystem

Figure 3:
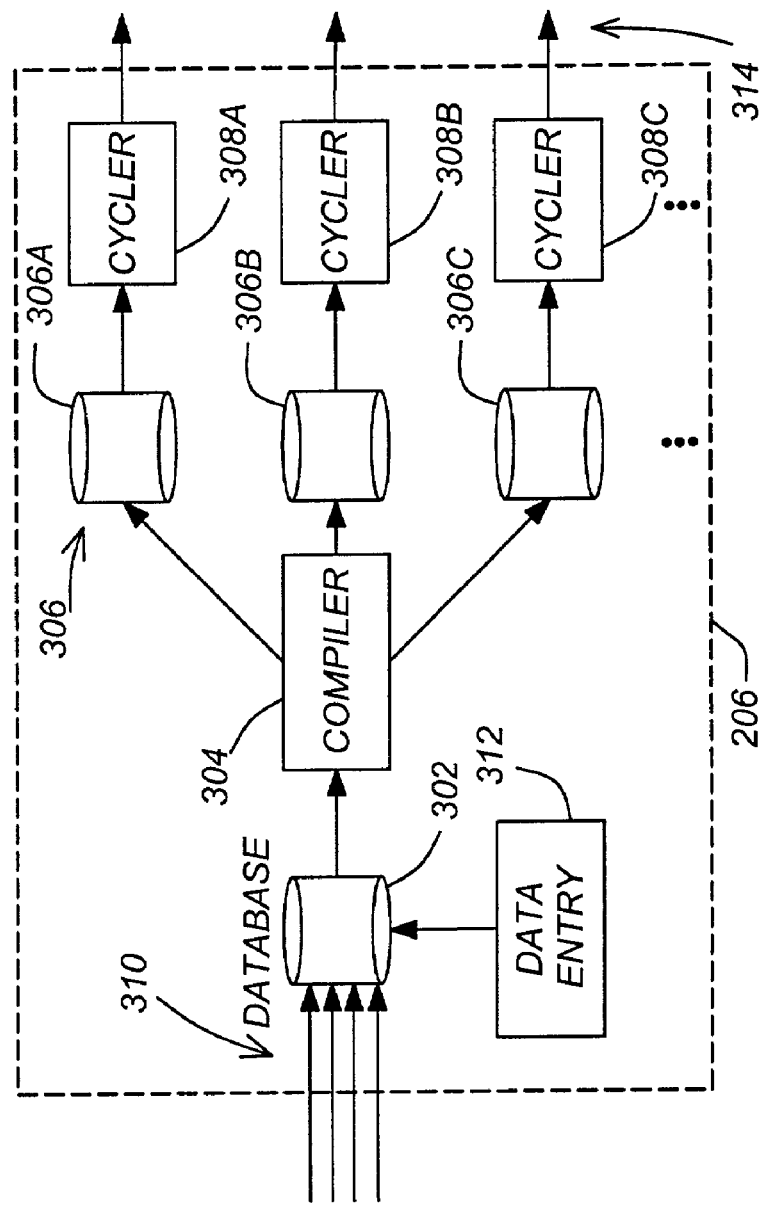
FIG. 3 is a block diagram of one embodiment of the program guide subsystem.

FIG. 3 is a block diagram of one embodiment of the program guide subsystem 206. The program guide data transmitting system 206 includes program guide database 302, compiler 304, sub-databases 306A-306C (collectively referred to as sub-databases 306) and cyclers 308A-308C (collectively referred to as cyclers 308).

Schedule feeds 310 provide electronic schedule information about the timing and content of various television channels, such as that found in television schedules contained in newspapers and television guides. Schedule feeds 310 preferably include information from one or more companies that specialize in providing schedule information, such as GNS, TRIBUNE MEDIA SERVICES, and T.V. DATA. The data provided by companies such as GNS, TRIBUNE MEDIA SERVICES and T.V. DATA are typically transmitted over telephone lines to program guide database 302. These companies provide television schedule data for all of the television stations across the nation plus the nationwide channels, such as SHOWTIME, HBO, and the DISNEY CHANNEL. The specific format of the data that are provided by these companies varies from company to company. Program guide database 302 preferably includes schedule data for television channels across the entire nation including all nationwide channels and local channels, regardless of whether the channels are transmitted by the transmission station.

Program guide database 302 is a computer-based system that receives data from schedule feeds 310 and organizes the data into a standard format. Compiler 304 reads the standard form data out of program guide database 302, identifies common schedule portions, converts the program guide data into the proper format for transmission to users (specifically, the program guide data are converted into objects as discussed below) and outputs the program guide data to one or more of sub-databases 308.

Program guide data are also manually entered into program guide database 302 through data entry station 312. Data entry station 312 allows an operator to enter additional scheduling information, as well as combining and organizing data supplied by the scheduling companies. As with the computer organized data, the manually entered data are converted by the compiler into separate objects and sent to one or more of sub-databases 306.

The program guide objects are temporarily stored in sub-databases 306 until cyclers 308 request the information. Each of cyclers 308 preferably transmits objects at a different rate than the other cyclers 308. For example, cycler 308A may transmit objects every second, while cyclers 308B and 308C may transmit objects every 5 seconds and every 10 seconds, respectively.

Since the subscriber's receivers may not always be on and receiving and saving objects, the program guide information is continuously re-transmitted. Program guide objects for programs that will be shown in the next couple of hours are sent more frequently than program guide objects for programs that will be shown later. Thus, the program guide objects for the most current programs are sent to a cycler 308 with a high rate of transmission, while program guide objects for later programs are sent to cyclers 308 with a lower rate of transmission. One or more of the data outputs 314 of cyclers 308 are forwarded to the packetizer of a particular transponder, as depicted in FIG. 2.

It is noted that the uplink configuration depicted in FIG. 2 and the program guide subsystem depicted in FIG. 3 can be implemented by one or more hardware modules, one or more software modules defining instructions performed by a processor, or a combination of both.

Broadcast Data Stream Format and Protocol

Figure 4A:
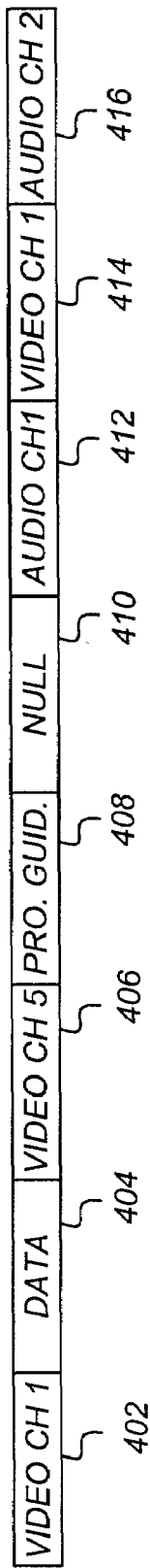
FIG. 4A is a diagram of a representative data stream received from a satellite.

FIG. 4A is a diagram of a representative data stream. The first packet segment 402 comprises information from video channel 1 (data coming from, for example, the first video program source 200A). The next packet segment 404 comprises computer data information that was obtained, for example from the computer data source 208. The next packet segment 406 comprises information from video channel 5 (from one of the video program sources 200). The next packet segment 408 comprises program guide information such as the information provided by the program guide subsystem 206. As shown in FIG. 4A, null packets 410 created by the null packet module 212 may be inserted into the data stream as desired.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver 200 receives these signals, and using the SCID, reassembles the packets to regenerate the program material for each of the channels.

Figure 4B:
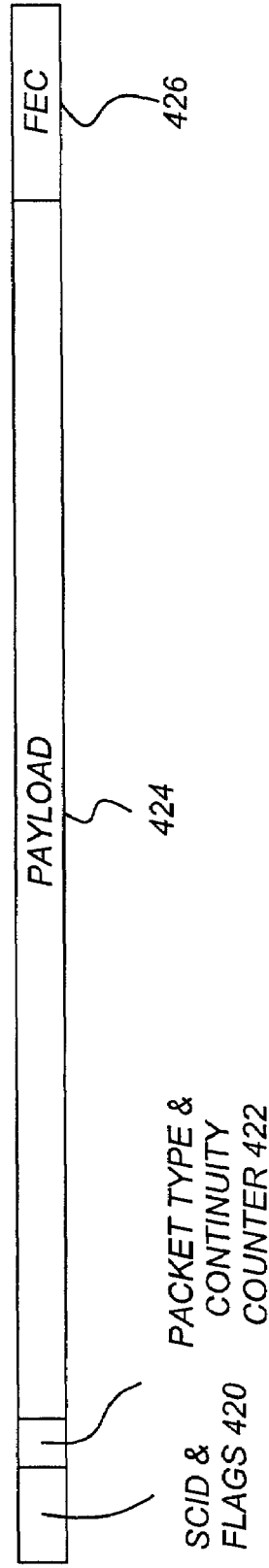
FIG. 4B is a diagram illustrating the structure of a data packet.

FIG. 4B is a diagram of a data packet. Each data packet (e.g. 402-416) is 147 bytes long, and comprises a number of packet segments. The first packet segment 420 comprises two bytes of information containing the SCID and flags. The SCID is a unique 12-bit number that uniquely identifies the data packet's data channel. The flags include 4 bits that are used to control functions unrelated to the preferred embodiment. The second packet segment 422 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 424 comprises 127 bytes of payload data, which is a portion of the video program provided by the video program source 300. The final packet segment 426 is data required to perform forward error correction.

Integrated Receiver/Decoder

FIG. 5 is a block diagram of an integrated receiver/decoder (IRD) 500 (also hereinafter alternatively referred to as receiver 500). The receiver 500 comprises a tuner/demodulator 504 communicatively coupled to an ODU 112 having one or more LNBs 502. The LNB 502 converts the 12.2- to 12.7 GHz downlink 118 signal from the satellites 108 to, e.g., a 950-1450 MHz signal required by the IRD's 500 tuner/demodulator 504. The LNB 502 may provide either a dual or a single output. The single-output LNB 502 has only one RF connector, while the dual output LNB 502 has two RF output connectors and can be used to feed a second tuner 504, a second receiver 500 or some other form of distribution system.

The tuner/demodulator 504 isolates a single, digitally modulated 24 MHz transponder, and converts the modulated data to a digital data stream. The digital data stream is then supplied to a forward error correction (FEC) decoder 506. This allows the IRD 500 to reassemble the data transmitted by the uplink center 104 (which applied the forward error correction to the desired signal before transmission to the subscriber receiving station 110) verifying that the correct data signal was received and correcting errors, if any. The error-corrected data may be fed from the FEC decoder module 506 to the transport module 508 via an 8-bit parallel interface.

The transport module 508 performs many of the data processing functions performed by the IRD 500. The transport module 508 processes data received from the FEC decoder module 506 and provides the processed data to the video MPEG decoder 514 and the audio MPEG decoder 516. In one embodiment of the present invention, the transport module, video MPEG decoder and audio MPEG decoder are all implemented on integrated circuits. This design promotes both space and power efficiency, and increases the security of the functions performed within the transport module 508. The transport module 508 also provides a passage for communications between the microcontroller 510 and the video and audio MPEG decoders 514, 516. As set forth more fully hereinafter, the transport module also works with the conditional access module (CAM) 512 to determine whether the subscriber receiving station 110 is permitted to access certain program material. Data from the transport module can also be supplied to external communication module 526.

The CAM 512 functions in association with other elements to decode an encrypted signal from the transport module 508. The CAM 512 may also be used for tracking and billing these services. In one embodiment of the present invention, the CAM 512 is a smart card, having contacts cooperatively interacting with contacts in the IRD 500 to pass information. In order to implement the processing performed in the CAM 512, the IRD 500, and specifically the transport module 508 provides a clock signal to the CAM 512.

Video data is processed by the MPEG video decoder 514. Using the video random access memory (RAM) 536, the MPEG video decoder 514 decodes the compressed video data and sends it to an encoder or video processor 515, which converts the digital video information received from the video MPEG module 514 into an output signal usable by a display or other output device. By way of example, processor 515 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if ATSC high definition programming is processed.

Audio data is likewise decoded by the MPEG audio decoder 516. The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats such as DOLBY DIGITAL AC-3™ may similarly be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microcontroller 510 receives and processes command signals from the remote control 524, an IRD 500 keyboard interface, and/or another input device. The microcontroller receives commands for performing its operations from a processor programming memory, which permanently stores such instructions for performing such commands. The processor programming memory may comprise a read only memory (ROM) 538, an electrically erasable programmable read only memory (EEPROM) 522 or, similar memory device. The microcontroller 510 also controls the other digital devices of the IRD 500 via address and data lines (denoted "A" and "D" respectively, in FIG. 5).

The modem 540 connects to the customer's phone line via the PSTN port 120. It calls, e.g. the program provider, and transmits the customer's purchase information for billing purposes, and/or other information. The modem 540 is controlled by the microprocessor 510. The modem 540 can output data to other I/O port types including standard parallel and serial computer I/O ports.

The preferred embodiment may also comprise a local storage unit such as the video storage device 532 for storing video and/or audio data obtained from the transport module 508. Video storage device 532 can be a hard disk drive, a read/writable compact disc of DVD, a solid state RAM, or any other storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video data from the video storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microcontroller 510 can also perform the operations required to store and or retrieve video and other data in the video storage device 532.

The video processing module 515 output can be directly supplied as a video output to a viewing device such as a video or computer monitor. In addition the video and/or audio outputs can be supplied to an RF modulator 534 to produce an RF output and/or 8 vestigal side band (VSB) suitable as an input signal to a conventional television tuner. This allows the receiver 500 to operate with televisions without a video input.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the IRD 500 also receives and stores a program guide in a memory available to the microcontroller 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite networks, satellite transponders and service channel identifications (SCIDs), and also provide TV program listing information to the subscriber 122 identifying program events.

The functionality implemented in the IRD 500 depicted in FIG. 5 can be implemented by one or more hardware modules, one or more software modules defining instructions performed by a processor, or a combination of both.

Multiple Satellite Video Distribution System

Figure 6:
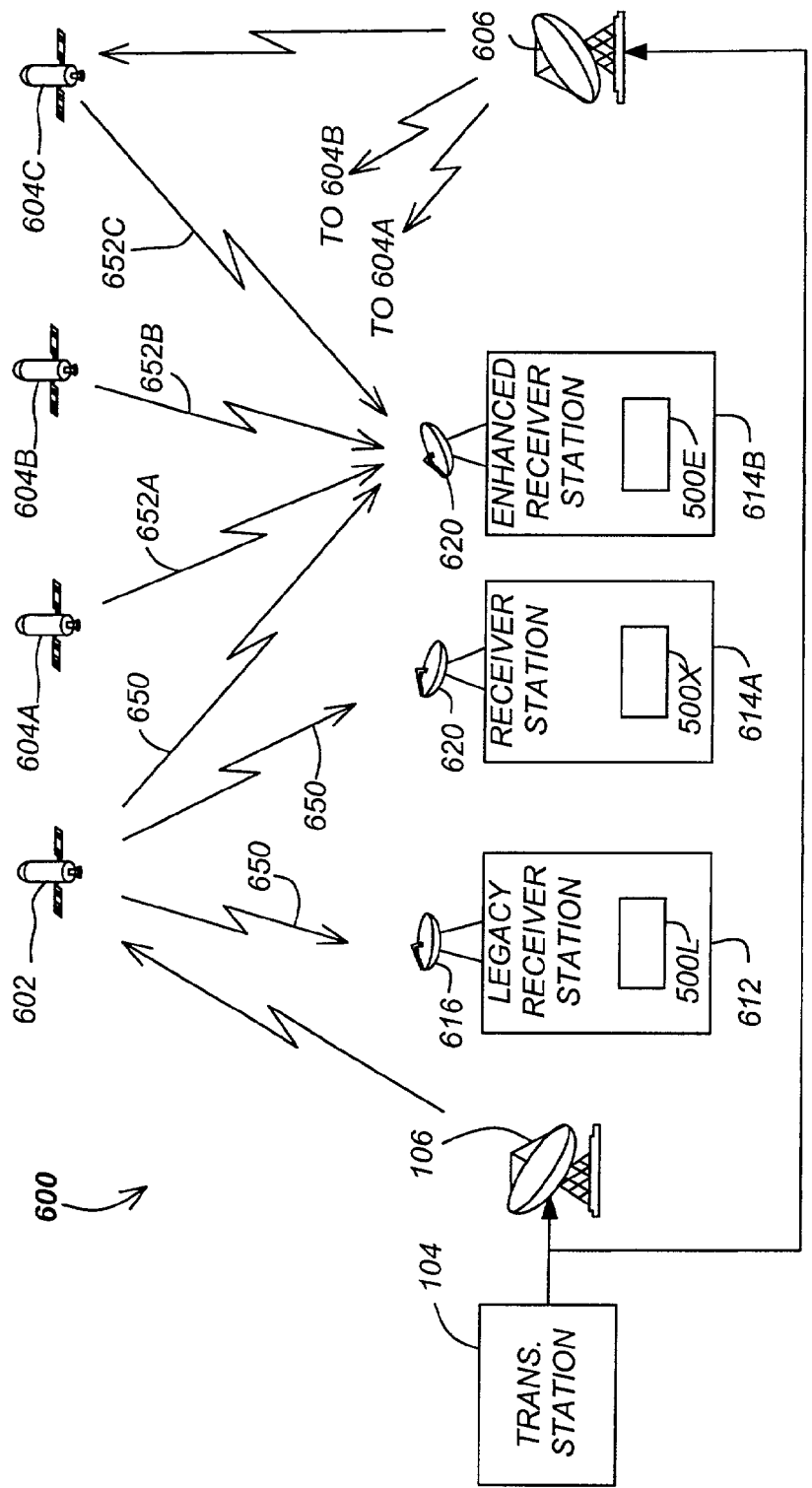
FIG. 6 is a diagram showing a multi-source media program distribution system.

FIG. 6 is a diagram depicting a multiple satellite media broadcasting system 600. Such a multi-satellite system can be used to provide selected subscribers 122 with additional program channels that are unavailable in the single satellite media broadcasting system 100 depicted in FIG. 1. The multiple satellite media broadcasting system 600 includes a legacy service network with a first or legacy satellite 602 (analogous to satellite 108) receiving signals from uplink antenna 106 and one or more enhanced service networks, each with one or more enhanced service satellite(s) 604A-604C (hereinafter referred to as enhanced service satellite(s) 604) receiving signals from one or more enhanced uplink dish(es) 606.

The legacy satellite 602 broadcasts a first signal 650 to legacy receiver stations 612 (which are analogous to the subscriber station(s) 110 of FIG. 1) having a legacy ODU 616 and a legacy receiver such as a legacy IRD 500L. The first signal 650 includes a first set of programs (e.g. video, audio, and/or data programs) and first program guide information describing at least a portion of the first set of programs. The program guide information is broadcast, for example, on SCID 408 of the first signal.

The enhanced services satellites 604 broadcast second signals 652A-652C (hereinafter alternatively referred to as second signal(s) 652). The second signals 652 include a second set of program material (e.g. video, audio, and/or data programs) and second program guide information describing at least a portion of the second set of program material.

The legacy satellite 602 also broadcasts signals to receiver station 614A and enhanced receiver station 614B. Like the legacy receiver station 612, receiver station 614A is configured to receive only those signals 650 transmitted from the legacy satellite 602 (including legacy program guide information). Receiver station 614A however, includes an expanded IRD 500X that is capable of receiving legacy program guide information on the same service channel as the legacy IRD 500L and other program guide information on different service channels. In one embodiment, receiver station 614A is limited to receiving only signals from the legacy satellite 602 by virtue of its use of a communicatively coupled legacy ODU 616 that is incapable of receiving signals from more than one satellite 108. In another embodiment of the present invention, the receiver station 614A may include a communicatively coupled enhanced ODU 620 capable of receiving signals from multiple satellites 108 including the legacy satellite 602 and one or more of the enhanced services satellites 604, but the IRD 500X itself precludes reception of channels and program guide information from the enhanced services satellites 604.

Like the receiver station 614A, the enhanced receiver station 614B is configured to receive signals 650 from the legacy satellite 602, including both the legacy program guide information on a first service channel and other program guide information on the different service channels. Unlike the receiver station 614A or the legacy receiver station 612, the enhanced receiver station 614B is configured to receive one or more second signals 652 from one or more of the enhanced services satellites 604 as well. This is accomplished via an enhanced services ODU 620 (which can receive signals from both the legacy satellite 602 and one or more of the enhanced services satellites 604) communicatively coupled to an enhanced IRD 500E.

The legacy satellite 602 and the enhanced services satellites 604 are disposed in geosynchronous orbit slots that are proximate one another. This allows a single enhanced services ODU 620 to receive signals from both the legacy satellite 602 and one or more of the enhanced service satellites 604. In one embodiment, the enhanced services antenna 620 comprises an oval, rather than parabolic reflector for simultaneously directing energy into two or more proximately disposed LNBs. When the user selects program material broadcast on the enhanced services satellites 604, the enhanced receiver station's 614B enhanced IRD 500E switches LNBs on the enhanced ODU 620 to receive the broadcast from the enhanced services satellite 604 transmitting the desired broadcast material. Conversely, when the user selects program material broadcast on the legacy satellite 602, the enhanced IRD 500E in the enhanced receiver station 614B switches LNBs to receive the broadcast from the legacy satellite 602. In one embodiment, the orbital locations of the satellites 602 and 604 are chosen so that the broadcasts from each satellite can be distinguished by the enhanced service antennae 620, but close enough so that both signals can be received without physically slewing the sensitive axis of the enhanced service antennae 620.

To assure that subscribers 122 that have newly activated IRDs 500 can acquire and present program guide information without excessive delay, the program guide information is periodically re-transmitted. Typically, the program guide information broadcast by each satellite 108 is limited to that which describes the media programs broadcasted by the satellites 108 in the service network itself. Hence, legacy satellite 602 broadcasts program guide information describing only the media programs broadcast by legacy service network, and enhanced services satellite 604A broadcasts program guide information describing only the media programs broadcast by the enhanced service network. This technique minimizes the use of downlink bandwidth by restricting the transmission of program guide information to subscribers 122 that can receive the media programs described in the program guide. This is important, since the information must be re-transmitted at frequent intervals.

At the same time, however, this technique has distinct disadvantages. When an enhanced services IRD 500E in an enhanced receiving station 614B switches from receiving the first signal 650 from a legacy satellite 602 in the legacy service network to receiving the second signal 652 from one of the enhanced services satellites 604 in the enhanced service network, the subscriber 122 may witness a delay of up to several seconds before the program guide for the enhanced services is presented. This delay is due, at least in part, to the time delay between each retransmission of the program guide information from the enhanced services satellite 604 to the enhanced IRD 500E. The preferred embodiment solves this problem by providing the program guide information from the enhanced services satellites 604 (also known as "foreign" program guide information) to the subscriber 122 via the first signal 650 instead of the second signal 652.

Program Guides

The program guide transmitted with the first signal 650 by the legacy satellite 602 may include a master program guide (MPG). The MPG includes a table which lists the viewer channels and the services (e.g. media programs and other data) provided on the viewer channels. Typically, at any particular time, the MPG includes about three hours of program information. The MPG is typically 240 data packets in size, but is scaleable in channel count and schedule coverage. Hence, if the MPG has fewer hours of program information, a greater number of channels can be included, and if fewer channels are required, the MPG can include four or more hours of program information. To support newly activated receivers, MPGs are transmitted every 4 seconds.

The MPG transmitted with the first signal 650 by the legacy satellite 602 may also include a special program guide (SPG). The special program guide is a table of channels like the MPG, but for special uses such as later blocks of time. The SPG typically includes about eight hours of program information. SPGs are retransmitted about every 6 seconds. Since IRDs are instructed not to use information from an MPG based upon the MPG's default transmitting network ID, the SPG is sent on the same logical network as declared by the MPG's default transmitting network ID. This ensures that the SPGs can be acquired when appropriate.

The MPG and SPG include a reference (typically a 16-bit number) to a descriptive information parcel (DIP), which includes descriptive text for a particular media program or viewer channel. This text is displayed to the subscriber 122 by the IRD 500.

DIPs are acquired based on filtering the description stream for a unique DIP tag, which can be simply a 32-bit number. A viewer channel's description stream may be broadcast by the same transponder used to broadcast the channel's media program and services, or by a transponder other than that which is used to carry the channel's media programs and services. DIPs are typically transmitted on the same logical network as is transmitting the channel's video/audio/data services. This ensures that the DIP can be acquired if the channel's services can be acquired.

In one embodiment, each MPG includes a segment map (SEGM), additional program guide data (APGD) and one or more pairs of Channel-to-Service Segment Maps (CSSM) and Program Information Structures (PISM). The SEGM includes a default transmitting network identifier (e.g. Default_Transmitting_Network_ID) that has a value identifying a default satellite service network transmitting the viewer channels in the MPG.

A summary of the contents of the CSSM is presented in Table I below:

TABLE I

| Field | Definition |
|---|---|
| Sync | A bit pattern used to identify the beginning of a CSSM |
| Header | 4-bit field that denotes the beginning of a CSSM |
| Segment Number | A segment number that is assigned to this the group of channels in the CSSM by the corresponding position in the SEGM. |
| Num Channels | An 8 bit unsigned integer that indicates the number of channels defined in the segment. If the CSSM has no channel, this value is set to zero and no channel map exists. |
| Size | The number of bytes in the CSSM |
| Channel Map | The union of all CI information records |
| CI Heap | Holds variable length channel data |

The CSSM includes a channel map (CM) field having one or more channel information (CI) records, and a CI heap which includes variable-length viewer channel data. In this context, the viewer channel includes at most one video stream and possibly several data and/or several audio streams, and each stream is designated by a SCID number. For a simple television viewer channel, one video and one audio, the CI record is 17 bytes.

The variable channel map field is the union of all channel information records, one for each viewer channel number in the group of channels described in the SEGM.

Each CI record includes a NSCID field, which includes the number of SCIDs used for the viewer channel, a transponder number (PIP xpdr) indicating the transponder from which the PIPs for the viewer channel are transmitted, a transponder number (DIP xpdr) indicating the transponder from which the DIPs for the viewer channel are transmitted, a viewer channel number (channel number), which specifies the viewer channel the user selects to gain access to the program material, and name (Short Name) providing a four character channel designator for the viewer channel (i.e. "PBS <space>"), and a viewer channel identifier called a customer service segment (CSS) byte. The CSS byte is provided for each viewer channel, and is used in conjunction with the transmitting network identifier to control access to the program associated with the viewer channel.

This access control includes, for example, a determination as to whether the channel should appear in the program guide and/or whether the program material broadcast on the channel should be presented to the subscriber 122. The viewer channel is made available to the subscriber based upon a comparison between the Transmitting_Network_ID and the configuration of the IRD 500 (indicating which of the service networks can be received by the IRD 500) and a comparison between the value of the CSS and a value in the conditional access module 512. This is discussed further below with respect to FIGS. 8A and 8B.

The preferred embodiment defines several categories of the MPGs described above, namely:

Unified MPG: A unified MPG is a single MPG assembled from the program channels of two or more networks.

Foreign MPG: A foreign MPG is an MPG with program information describing the program channels being broadcast by another satellite.

Market MPG: A market MPG provides program guide information for a set of channels that are restricted to a particular geographic region (e.g. a subset of CONUS) or other selection criteria. The processing and presentation of market MPGs are performed according to the IRD's Market_ID.

As will be discussed further below with respect to FIG. 7, the MPGs transmitted by a particular broadcast satellite are transmitted on a service channel having a unique SCID. For the legacy receivers 612, the service channel carrying the MPG has the SCID value of 0x001. This MPG is hereinafter referred to as the legacy MPG. For the non-legacy receivers 614, the SCID value is a different value (e.g. 0x009) offset from the SCID value for the legacy MPG. This MPG is hereinafter referred to as the tailored MPG. Since MPGs in general, and specifically the legacy and tailored MPGs, are typically broadcast throughout the lower 48 states, they are hereinafter alternatively referred to as legacy CONUS MPG, and tailored CONUS MPG, respectively. The term CONUS refers to the geographical scope of the beam pattern of the satellite 108 broadcasting the signal. A CONUS MPG is transmitted on all transponders of a satellite 108 and describes the channels for all IRDs 500, regardless of the IRD's specific location. The CONUS MPG may also describe channels that may be acquired in Hawaii or Alaska, by for example, using an extension of the beam pattern for the satellite 108.

FIG. 7 presents a table of information broadcast on each SCID by each of the satellites in the multiple satellite video distribution system. The first column 702 shows the SCID for each service channel. The second column shows the relationship between each SCID and the information included in the data packet identified by the SCID for transmissions from the legacy satellite 602 (Service Network 0 704). The third, fourth, and fifth columns show the relationship between each SCID and the information included in the data packet identified by the SCID for transmissions to each enhanced service satellites 604A, 604B, and 604C (Service Network 1 706, Service Network 2 708, and Service Network 3 710, respectively). Nominally, the legacy satellite 602 is disposed in a geosynchronous orbital slot at approximately 101° longitude, and the enhanced service satellites 604 are in geosynchronous orbital slots at approximately 95°, 110°, and 119° longitude.

Each of the satellites 108 in the multi-satellite video distribution system 600 broadcasts the legacy CONUS MPG 712 on SCID_1 712. This allows legacy IRDs 500L (those that were designed to receive only legacy CONUS MPGs on SCID_1 712) to receive MPGs from each of the satellites (legacy satellite 602 and enhanced services satellites 604) as before. Hence, a legacy IRD 500L tuned to Service Network 0 704 (legacy satellite 620) would receive a legacy CONUS MPG 712A describing the program information for viewer channels broadcast by Service Network 0 704, a legacy IRD 500L tuned to Service Network 1 706 would receive a legacy CONUS MPG 712B describing the program information for viewer channels broadcast by Service Network 1 706, and so on. Each of the satellites in the multi-satellite video distribution system 600 also broadcast a conditional access packet (CAP) data stream on SCID_2, purchase information parcel (PIP) information on SCID_3. DIP information for the legacy CONUS MPG 712 is broadcast on SCID_4. Further, SPG information for the programming broadcast by each network is provided on SCID_5 714.

The legacy satellite 602 also broadcasts the tailored CONUS MPG 750, and the enhanced services satellites 604 broadcast the Unified MPG 754 on SCID_9. As described below, the unified MPG 754 includes program guide information associated with the viewer channels provided by both Service Network 2 708 and Service Network 3 710. The unified MPG 754 can include a union of all of the channels from Service Network 2 708 and Service Network 3 710, or a subset of such channels. If desired, program guide information associated with viewer channels provided by Service Network 1 706 can also be provided in the unified MPG 754, as well.

To allow IRDs 500 tuned to the enhanced services satellite 604 broadcasting Service Network 3 710 programming to receive program guide information being broadcast by the legacy satellite 602 (program guide information for Service Network 0 704 programming), the tailored CONUS MPG 750 for Service Network 0 704 (broadcast by the legacy satellite 602 on SCID_9) is also broadcast by the enhanced services satellite 604 on the SCID_502 of Service Network 3 710. Hence, an enhanced IRD 500E tuned to receive signals from Service Network 3 710 also receives the tailored CONUS MPG 750 for programs broadcast by Service Network 0 704. Since the tailored CONUS MPG 750 describes media program that are not being broadcast by Service Network 3 710, but rather Service Network 0 704, the tailored CONUS MPG 756 is referred to as a "Foreign" MPG 752.

Similarly, the unified MPG 754 (which describes at least a subset of the union of the program material broadcast by Service Network 2 708 and Service Network 3 710) is also transmitted by Service Network 0 704 on SCID 0x505 as a Foreign MPG 756. This allows enhanced IRDs 500E tuned to Service Network 0 704 to receive program guide information about the program material broadcast by Service Network 2 708 and Service Network 3 710. Since the enhanced IRD 500E is no longer required to tune to Service Network 2 708 or Service Network 3 710 to receive program guide information about the program material on transmitted by Service Network 2 708 or Service Network 3 710, program information about programs broadcast on these networks can be provided essentially instantaneously to the subscriber 122. In prior art systems, including those with Legacy IRDs 500L, when a subscriber 122 issues a command to view program guide information about the channels provided by the enhanced services satellites 604 (Service Networks 1-3), the IRD 500 must tune to the appropriate satellite, and wait until the next legacy CONUS MPG 712B-712D is broadcast. This period can approach several seconds.

Figure 8A:
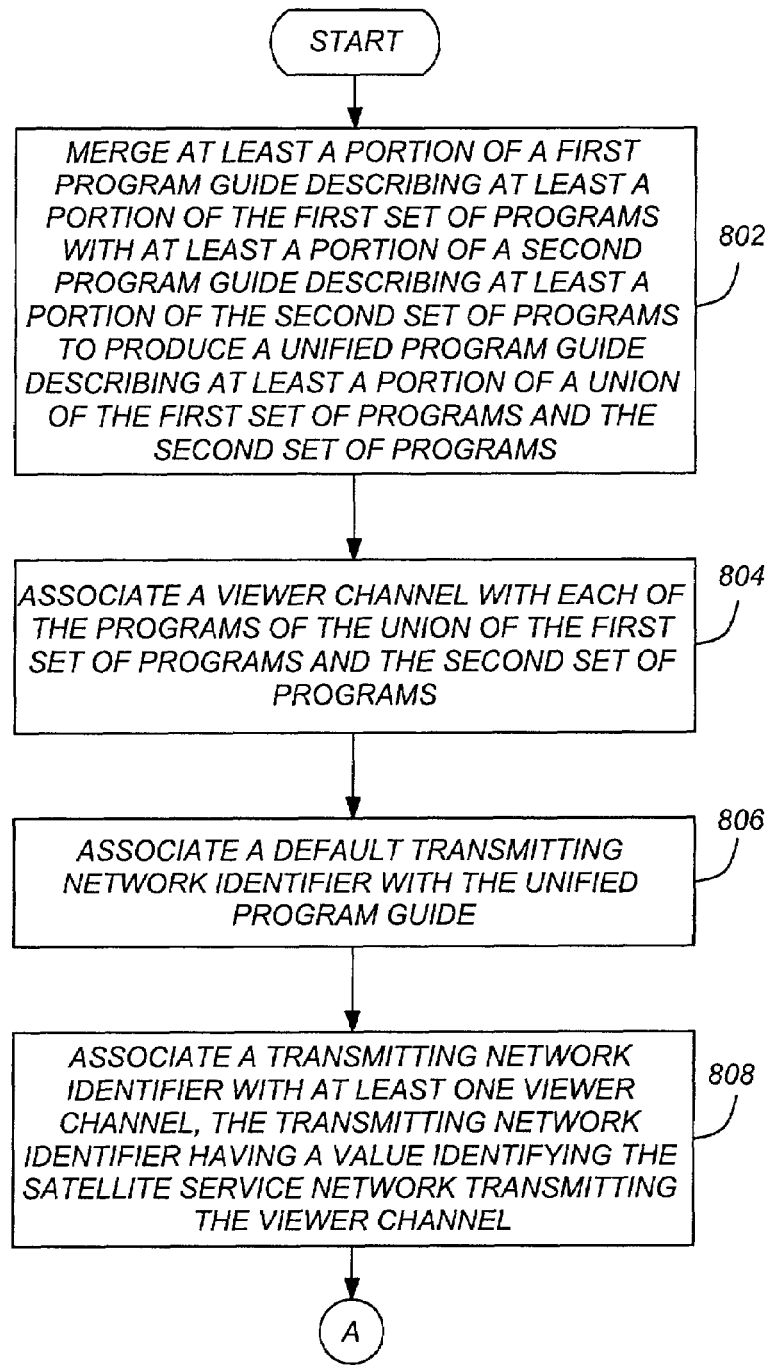
FIGS. 8A and 8B present a flow chart illustrating processing steps for generating a unified master program guide (MPG)
Figure 8B:
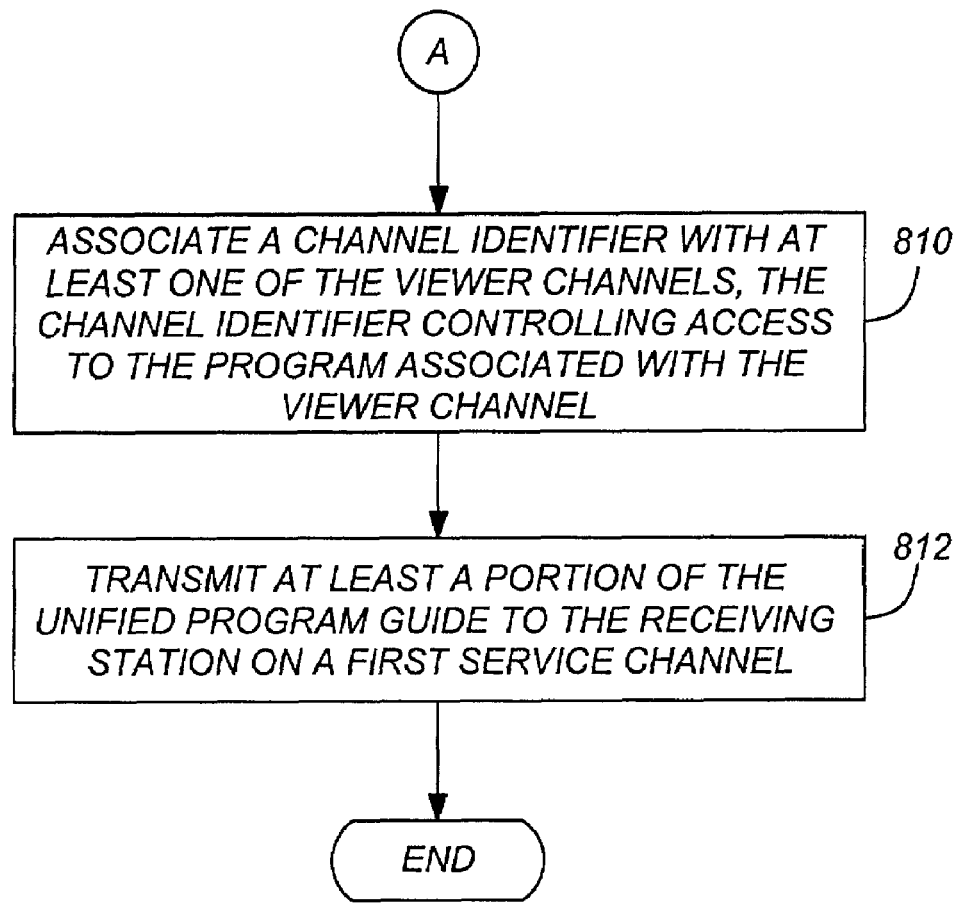

FIGS. 8A and 8B are diagrams illustrating the generation of the unified MPG 754. The unified MPG 754 combines the information presented regarding programs broadcast by multiple satellite networks into a single program guide. The receiver station presents a program guide to the user by selecting those programs and channels the subscriber 122 is entitled to receive.

At least a portion of a program guide describing at least a portion of a first set of programs broadcasted by a first service network (e.g. a program guide describing at least a portion of the programs broadcasted by service network 2 708 depicted in FIG. 7) are merged with at least a portion of a program guide describing at least a portion of a second set of programs broadcasted by a second satellite (e.g. a program guide describing at least a portion of the programs broadcast by service network 3 710 depicted in FIG. 7). This produces a unified program guide (unified MPG 754) describing at least a portion of a union of the first set of programs and the second set of programs. This is depicted in block 802. A viewer channel is then associated with each of the union of programs in the unified MPG 754, as shown in block 804. A default transmitting network identifier is associated with the unified MPG 754, (and thereby, with each channel in the unified MPG 754) as shown in block 806. In one embodiment, the default transmitting network identifier is the Default_Transmitting_Network_ID in the MPG's SEGM. As shown in block 808, a transmitting network identifier is associated with at least one of the viewer channels in the Unified MPG 754. In one embodiment, the transmitting network identifier is the Transmitting_Network_ID transmitted in the CI record or the CI heap of the CSSM. In block 810, a channel identifier is associated with one or more of the viewer channels in the Unified MPG 754. In one embodiment, the channel identifier includes the CSS transmitted in the CI heap of the CSSM. At least a portion of the unified MPG 754 is then transmitted to the receiving station 110 on a first service channel as shown in block 812. In the embodiment illustrated in FIG. 7, the unified MPG 754 describing at least a subset of the union of the programs from service network 2 708 and service network 3 710 is transmitted on SCID_9 716.

The preferred embodiment also supports the use of "foreign" program guides by allowing program guides being broadcast by a given network on a particular SCID to be broadcast by a different network on a different SCID. For example, the unified MPG 754 which describes at least some of the programs from service network 2 708 and service network 3 710, can be broadcast on SCID_9 716 of the signals from service network 2 708 and service network 3 710, and SCID_0x505 722 of the signal from network zero 704. With respect to service network 0 704, which normally receives the CONUS MPG 750 on SCID_9 716, the unified MPG 754 provided on SCID_0x505 722 is a "foreign" program guide, since it is associated with programs and viewer channels that are not broadcast by network zero 704.

Figure 9A:
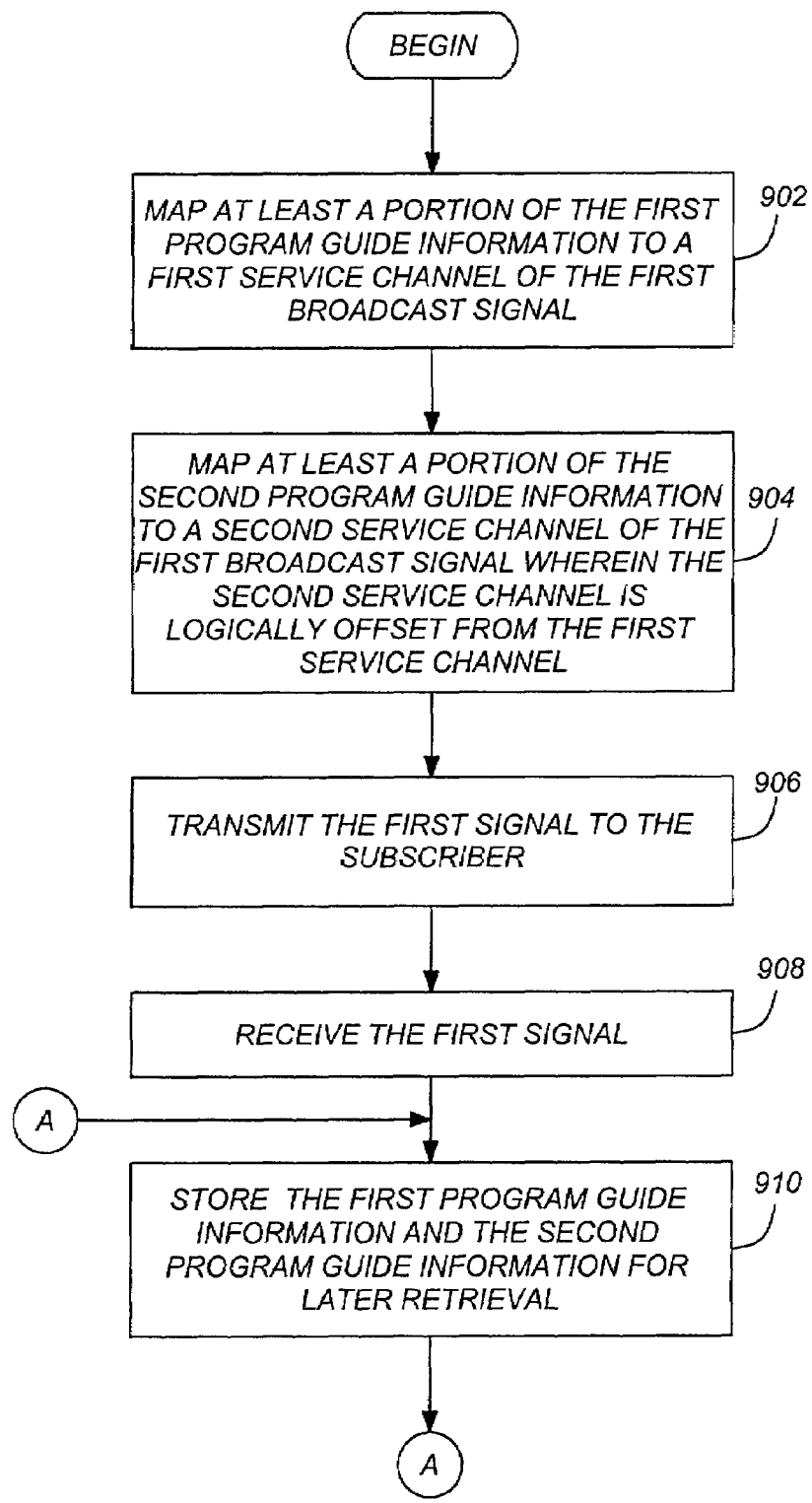
FIGS. 9A and 9B present a flow chart illustrating processing steps to implement foreign program guides.
Figure 9B:
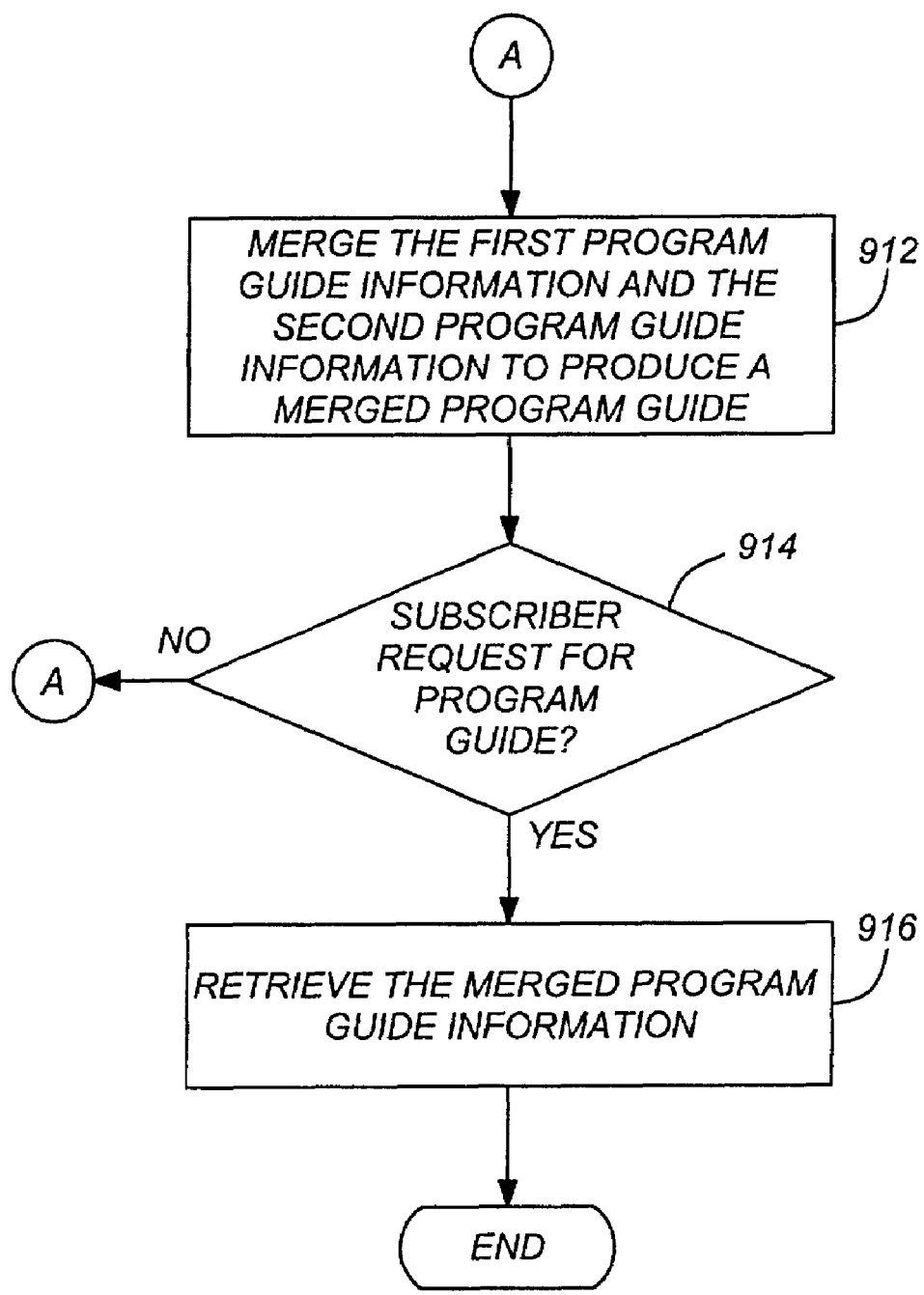

FIGS. 9A and 9B are flow charts depicting exemplary process steps used to implement the "foreign MPGs" by broadcasting MPGs on different SCIDs of different broadcast networks. At least a portion of first (e.g. "home") program guide information (such as the information in the tailored CONUS MPG 750) is mapped to a first service channel (such as SCID_9) of the first broadcast signal (such as first signal 650). This is depicted in block 902. At least a portion of second program guide information (such as the information in the unified MPG 754) is mapped to a second service channel (such as SCID_0x505 722) of the first broadcast signal. This is depicted in block 904. In one embodiment the second service channel is logically offset from the first channel through the use of different SCID values. FIG. 7, for example, illustrates a second service channel logically offset by the difference between the 0x505 SCID address 722 and the SCID_09 address 716. If desired, the offset between the first service channel and the second service channel can be specified in the first program guide information. These operations are typically performed by the program guide subsystem 206, and can take place in the control center 102 or the uplink center 104.

The first signal is then transmitted to the subscriber receiver station 110 as shown in block 906 using the uplink center transmitter 105 and/or the satellite transmitter 107.

As described above, the program guide information is transmitted from the satellite 108 to the subscriber receiving stations 110 on service channels identified by a SCID. This allows the video distribution system 100 a great deal of flexibility in transmitting the program guide information. This flexibility can be used to transmit the second program guide information and the first program guide information at different rates. This can be used to transmit the first program guide information to the subscriber receiving station 110 at a higher rate than the second program guide information (since it is more likely to be useful to the subscriber 122). Similarly, since the MPGs are flexible in terms of the number of channels and the amount of program information included therein (more program information can be provided at the expense of fewer channels and vice versa) the first program guide can provide information describing program material broadcast for a first time period (e.g. 3 hours) and the second program guide can provide information describing program material broadcast during a second time period (e.g. 1.5 hours, or 8 hours). Thus, the number of channels and period can be adjusted to accommodate the subscriber's needs.

Returning to FIG. 9A and referring to FIGS. 5 and 6, the first signal 650 is received by the tuner 504 in the subscriber's IRD 500E. The tuner 504 and the transport module 508 receive and detect the first program guide information (on SCID_9 716) and the second program guide information (SCID_0x505 722), and store this information in a memory for later retrieval. The memory can be the system RAM 528, or any communicatively coupled storage device. These operations are depicted in blocks 908 and 910.

Referring now to FIG. 9B, the first program guide information and the second program guide information may be merged at the receiving station 110 to form a merged program guide. This is depicted in block 912. The task of preparing the merged program guide can take place in the enhanced IRD 500E or in another communicatively coupled device. In one embodiment, the merging operations are performed by a software module implemented by use of operations stored in a memory in the IRD 500E such as processor ROM 538 or EEPROM 522 and a processor such as the microcontroller 510. In another embodiment, the task of creating the merged program guide can be performed by a separate hardware module 550 in the enhanced IRD 500E.

When the subscriber 122 requests program guide information, the merged program guide is retrieved and presented on a presentation device (such as a TV or a computer screen) communicatively coupled to the enhanced IRD 500E. These operations are depicted in blocks 914 and 916. The program guide information can also be merged before storage, or can be merged in response to a subscriber request for a program guide. Further, since the first and second program guide information can be retrieved with no significant delay, the second program guide information can be presented to the subscriber 122 only when specifically requested. For example, the first program guide includes information regarding viewer channels 1-100 and the second program guide information regarding viewer channels 100-200. If the subscriber 122 is viewing the program guide for channels 80-100, only the first program guide information need be retrieved. When the subscriber 122 requests viewing the program guide for channels 81-101, the appropriate second program guide information can be retrieved and merged with the first program guide information before presentation to the user.

In one embodiment of the present invention, the enhanced IRD 514 presents MPG information for only those channels that the IRD 500 and ODU 112 are configured to receive, and those channels which the subscriber 122 is authorized to receive. This is accomplished via the broadcasting system 600 providing information regarding the "home" or default service network broadcasting the program guide and information regarding the service network broadcasting the programs described by the program guide.

Figure 10A:
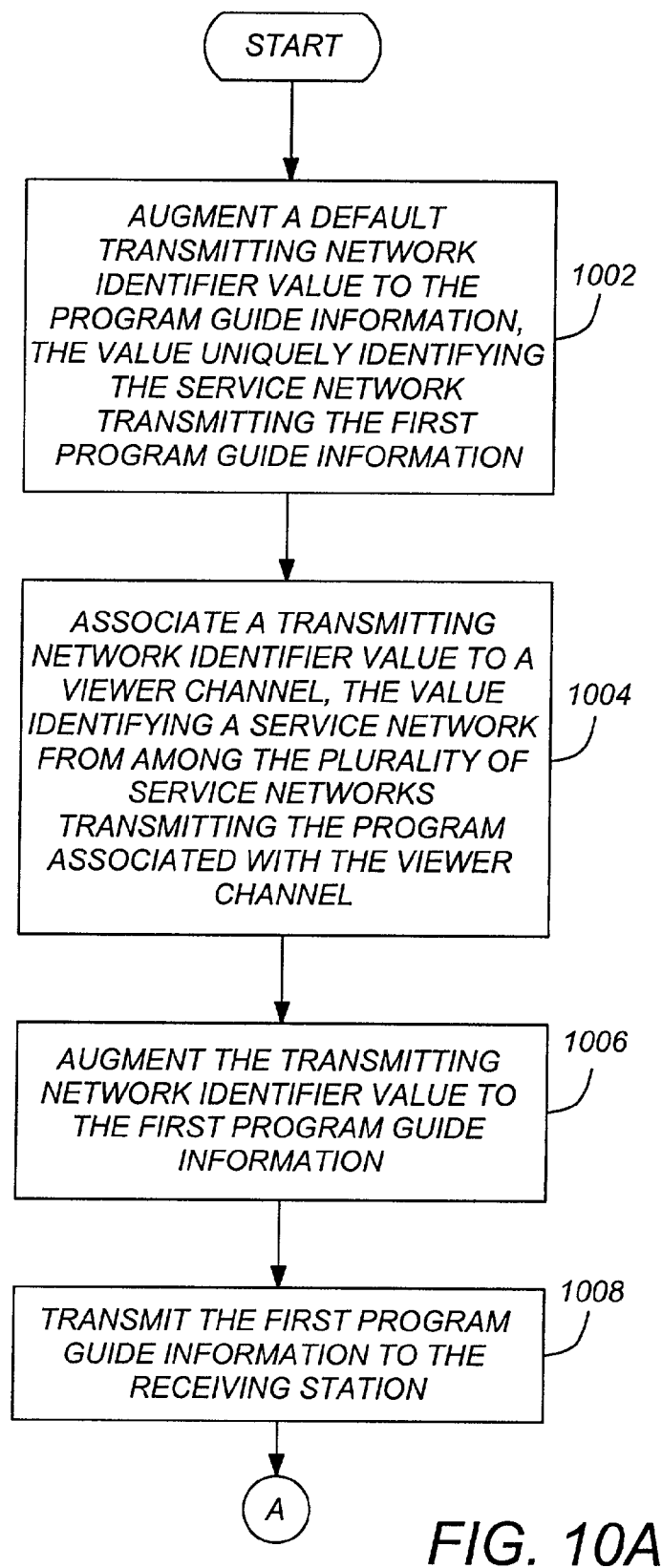
FIGS. 10A-10C are flow charts describing processing steps to implement selective presentation of viewer channels in the program guides.
Figure 10B:
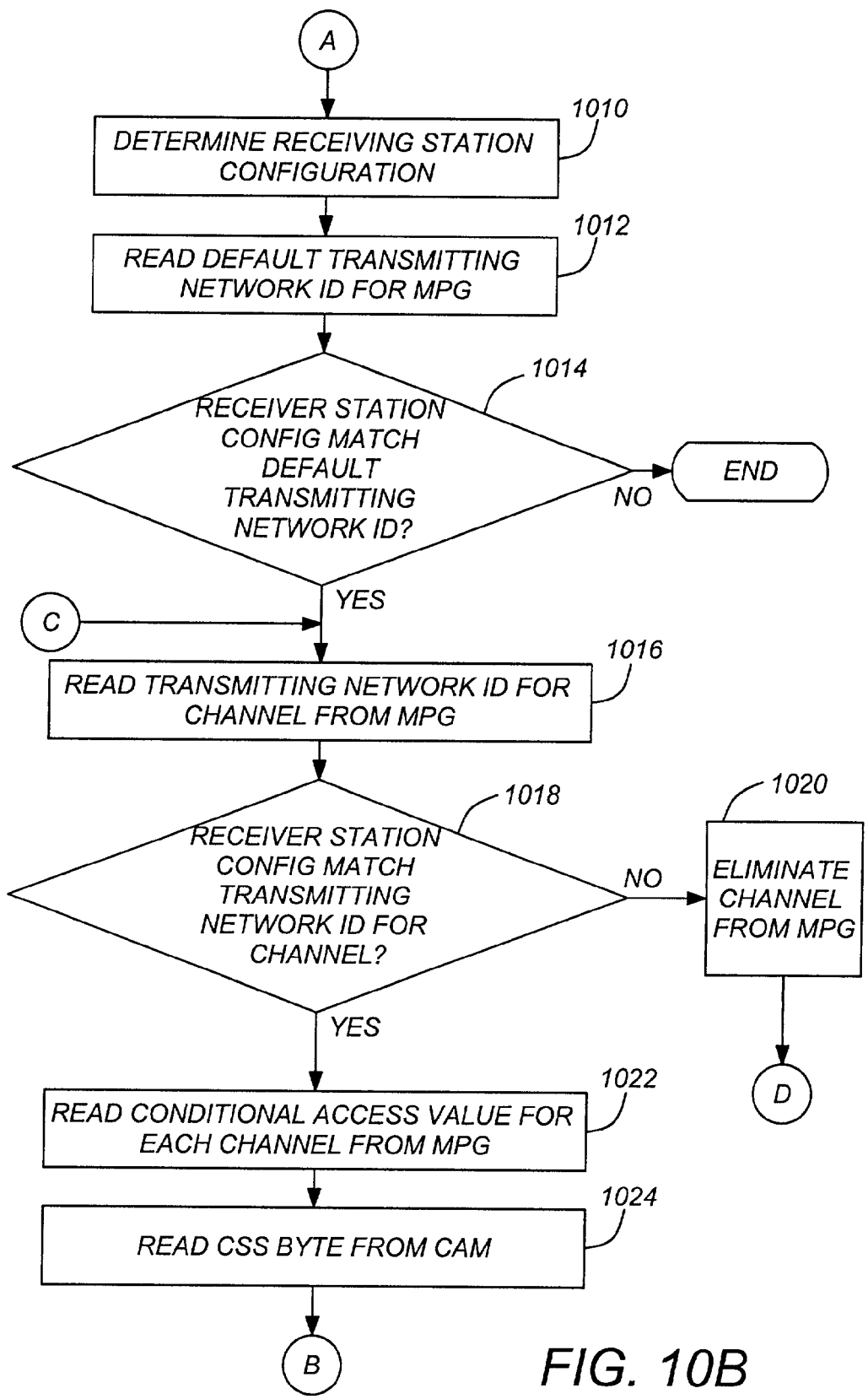
Figure 10C:
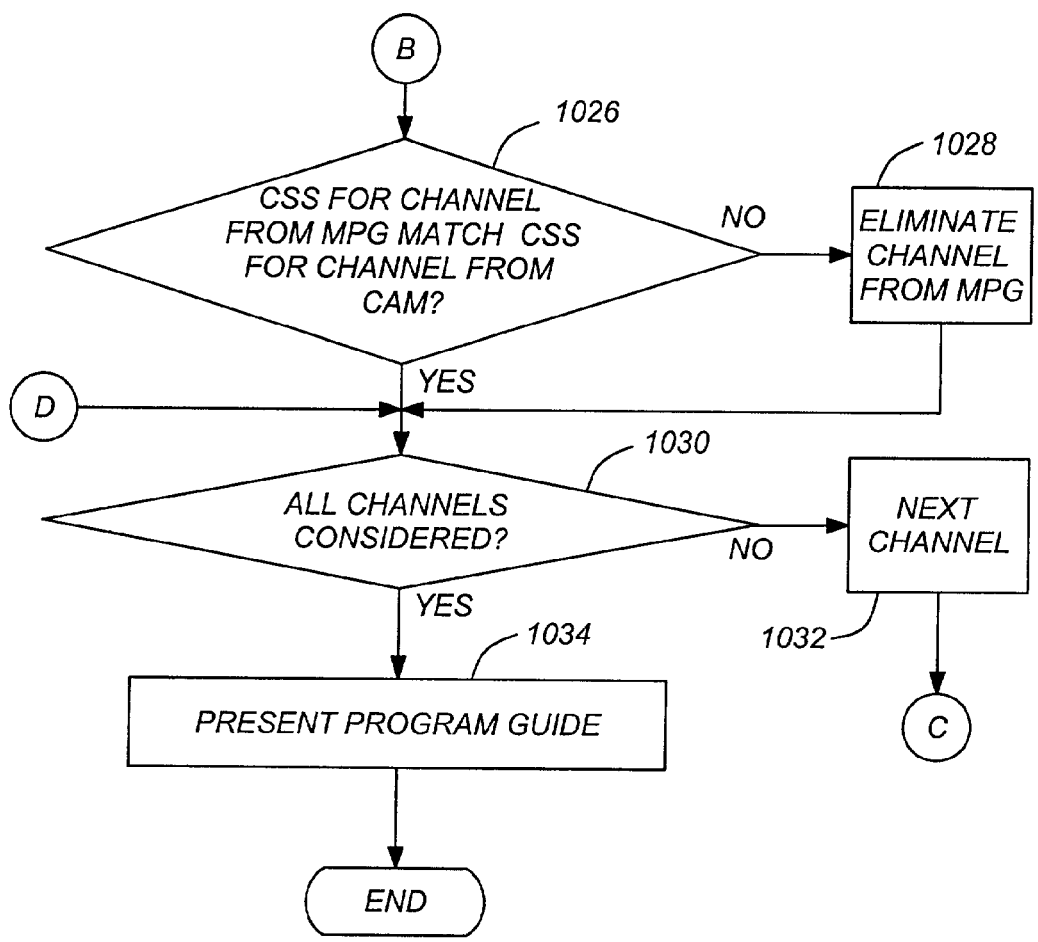

FIGS. 10A-10C are flow charts describing one embodiment of how this is accomplished.

FIG. 10A is a flow chart illustrating the operations performed by the broadcasting system 600 in providing information regarding the "home" or default service network broadcasting the program guide, and information regarding the service network broadcasting the programs within the program guide.

A default transmitting network identifier (e.g. Default_Transmitting_Network_ID) value is augmented to first program guide information broadcast by a first service network (e.g. one of the Service Networks 0-3). The transmitting network identifier uniquely identifies the service network transmitting the first program guide information. This is shown in block 1002. Each of the programs in the set of programs is associated with a viewer channel. In one embodiment, a transmitting network identifier value is associated with a viewer channel, wherein the transmitting network identifier uniquely identifies the service network transmitting the program associated with the viewer channel, and the first program guide information is augmented with this information. This is depicted in blocks 1004 and 1006. The first program guide information with the augmented information is then transmitted to the receiver station 110, as shown in block 1008.

FIG. 10B is a flow chart illustrating operations performed at the receiving station 1110. The program guide information is received and a receiving station 110 configuration is determined, as shown in block 1010. In one embodiment, the receiving station 110 includes one of three configurations. In a first configuration, the receiving station 110 is configured to receive signals only from the legacy satellite 602. In this case, the ODU 112 has a single LNB configured to receive signals from a single satellite (e.g. a legacy ODU 616 configured to receive signals from the legacy satellite 602). This configuration is analogous to that of a legacy receiving station 612. In a second configuration, the receiving station 110 is configured to receive signals from two or more satellites, including, for example, the legacy satellite 602 and an enhanced services satellite 604. In this case, the ODU 110 is an enhanced services ODU 620 with at least two LNBs and an oval antenna reflector dish. In a third configuration, the receiving station 110 is configured to receive signals from three or more satellites, including, for example, the legacy satellite 602 and two or more of the enhanced services satellites 604. In this configuration, the ODU 110 is also an enhanced services ODU 620, but typically has at least three LNBs and an oval antenna reflector. The second and third configurations are analogous to the enhanced receiving station 614B.

In one embodiment, the configuration of the receiver station 110 is determined according to the subscriber 122 selected responses to graphically presented setup selections depicting images of the ODU 110 hardware with one, two, or three LNBs. If desired, a default setting (before the subscriber 112 makes any selection) can be used. Subscriber 122 responses can be accepted via I/O device 524. The configuration may also be set or altered by data transmitted to the IRD 500 from a satellite 108 or the control center 102.

Any or all of the foregoing operations can be performed by an IRD 500 processor such as the microcontroller 510 using software instructions in modules stored in a memory such as processor ROM 538, EEPROM 522 or system RAM 528, or by separate hardware modules in the receiver station 110.

A default transmitting network identifier is read from the SEGM of the MPG and compared to the determined receiver station 110 configuration, as shown in blocks 1012 and 1014. If the receiving station 110 configuration does not match the default transmitting network identifier, a determination is made that the receiving station 110 is not configured to retrieve the viewer channels described in the MPG, and the MPG and/or viewer channels described by the MPG are not presented to the subscriber 112. Therefore, processing therefore need proceed no further than examining the default transmitting network identifier in the SEGM of the MPG.

An MPG with a default transmitting network identifier of 0 will be presented by all receiver station 110 configurations. An MPG with a default transmitting network identifier of 3 will be presented only by a receiving station 110 having a double LNB or a triple LNB configuration.

An exemplary default transmitting network identifier is the Default_Transmitting_Network ID field in the SEGM of the MPG described in Table II below.

TABLE II

| | | MPG SEGM Field | |
|---|---|---|---|
| Service Network | Legacy/ Enhanced | Transmitting_ Network_ID | Default Transmitting_ Network_ID |
| 1 | Legacy | 0 | 0 |
| 2 | Enhanced | 1 | 1 |
| 3 | Enhanced | 2 | 3 |
| 4 | Enhanced | 3 | |

Table III below shows an exemplary relationship between the receiver station 110 configuration and a parameter (MPG_Network_ID) indicating whether the receiver station 110 is configured to receive signals from one or more enhanced services satellites 604A and 604B as well as the legacy satellite 602. This initial setting can be overridden via a "set MPG Network_ID" command transmitted to the IRD 500, if desired.

TABLE III

| Receiver Station Configuration | MPG_Network ID | Permitted Transmitting_Network IDs |
|---|---|---|
| Single LNB (Legacy ODU) | 1 | 0 and 255 |
| Double LNB (Enhanced ODU) | 2 | 0 and 3 |
| Triple LNB (Enhanced ODU) | 3 | 0 and 2 and 3 |

Legacy IRDs 500L can only control a single LNB and are thus are configured to receive only the legacy CONUS MPG 712 information presented on SCID_1 712. An example of how the configuration for a receiver station 110 configuration having a non-legacy IRD or ODU is compared to the default transmitting network identifier is presented below.

An extended IRD 500X communicatively coupled to a legacy ODU 616 receives and processes the MPG information on SCID_9 and a SCID that is logically offset from SCID_9 by an amount that is specified in the MPG information broadcast on SCID_9 (in the example shown in FIG. 7, SCID__0x505 722). The MPG transmitted on SCID_9 716 is the tailored MPG 750 for Service Network 0 704. The MPG transmitted on the logically offset SCID is a foreign MPG 756 (since it describes program material broadcast on a second signal 652 by an enhanced services satellite 604). However, since the received signal is the first signal 650 from the legacy satellite 602, the value of the Default Transmitting_Network ID associated with the viewer channel is 3. Since this does not match the receiving station 110 configuration, the channels described by the foreign MPG 756 will not be presented to the subscriber 122. However, the value of the Default Transmitting_Network_ID for the tailored MPG 750 is 0, and since this matches the receiving station 110 configuration, the channels described by the tailored MPG 756 will be presented to the subscriber 122.

An enhanced IRD 500E communicatively coupled to an extended ODU 620 includes a double or triple LNB. The enhanced IRD also receives and processes the MPG information on SCID_9 716 (the unified MPG 754 or the Tailored MPG 750, depending upon the Service Network being received at that moment).

If the received signal is the first signal 650 from the legacy satellite 602, the SEGM of the foreign MPG 756 includes a default transmitting network identifier value of 3. Also, the foreign MPG 756 (in this case, the MPG from Service Network 2 708 and Service Network 3 710) is broadcast on a SCID that is logically offset from SCID_9 (SCID__0x505). The enhanced IRD 500E compares the default transmitting network identifier value (in this case, 0) to the configuration of the MPG_Network ID of Table I (in this case, 2 or 3) and determines that the foreign MPG 756 (as well as the tailored MPG 750) should be presented to the subscriber 122.

If the received signal is a second signal 652C from an enhanced services satellite 604C, the foreign MPG 752 (in this case, the MPG from Service Network 0 704) is also broadcast on a SCID that is logically offset from SCID_9 716, but information in the unified MPG 754 broadcast on SCID_9 716 indicates that the foreign MPG 752 is on a SCID that is logically offset from SCID_9 716 by a different value, in this case, SCID__0x502 720 instead of SCID__0x505 722). The enhanced IRD 500E compares the default transmitting network identifier value (in this case, 3) to the configuration of the MPG_Network ID of Table I (in this case, 3) and determines that the foreign MPG 752 (as well as the unified MPG 754) should be presented to the subscriber 122.

Returning to FIG. 10B, if the receiving station 110 configuration matches the default transmitting network, processing continues to block 1016, which reads the transmitting network identifier (e.g. Transmitting_Network_ID) for a viewer channel from the CI heap of the MPG. If the receiver station 110 configuration does not match the transmitting network identifier for the viewer channel under consideration (as depicted by block 1018), the viewer channel is eliminated from the MPG (or simply not added to the MPG), as shown in block 1020 and processing proceeds to block 1030 in FIG. 10C. If the receiving station 110 configuration matches the transmitting network identifier for the viewer channel under consideration (determined by block 1018), a channel identifier value is read from the MPG, and a conditional access value is read, as shown in blocks 1022 and 1024. The channel identifier is examined to determine if the channel should be presented to the subscriber 122. This is depicted in blocks 1022-1028 of FIGS. 10B and 10C.

Block 1022 reads a channel identifier (e.g. CSS) value for the channel from the CI record or the CI heap of the MPG. If the CSS value from the MPG is zero, processing passes to block 1030, and the viewer channel under scrutiny is provided in the MPG. If the CSS value from the MPG is non-zero, a conditional access value is read, as shown in block 1024. The conditional access value is compared to a the CSS value to determine if the viewer channel should be provided in the MPG. If the viewer channel should not be provided, it is eliminated from the MPG, as shown in block 1028. Alternatively, the viewer channel can simply not be added to the MPG. In one embodiment, the conditional access value is a CSS byte obtained from the CAM 512, and the viewer channel is provided in the MPG if at least one bit of the CSS value from the MPG and the CSS byte match. In other words, the channel added to the MPG when:

$$Channel\_CSS=0, \text{ or}$$

$$Channel\_CSS \oplus CAM\_CSS \neq 0$$

A check is made to determine if all of the viewer channels in the received MPG have been examined to determine if they should be presented to the subscriber 122. This is depicted in block 1030. If additional channels must be examined, the next channel is considered, and processing is routed to block 1016. If all channels have been examined, processing is routed to block 1034, and the program guide display generated by performing the above operations is presented to the subscriber 122.

Tuning a channel's services is accomplished via the IRD 500 instructing the ODU to pass the channel's transmitting network ID to the IRD 500. This is accomplished by pointing the subscriber receiving station antenna's sensitive axis to the satellite broadcasting the channel, whether by mechanical or electrical slewing or by switching LNBs via a multiswitch.

Hence, the above logic implements a strategy in which for each channel that has a Transmitting_Network_ID value specified in the channel's CI heap, the channel is made available to the subscriber only if the receiver station 100 is configured to have access to the channel, as specified by the Transmitting_Network_ID and MPG Network_ID, and if a CSS evaluation process indicates that access should be provided.

Market Program Guides

As previously described, satellite-based video distribution systems are now permitted to provide local content programs to subscribers within the market areas serviced by the originating broadcast provider.

Figure 11:
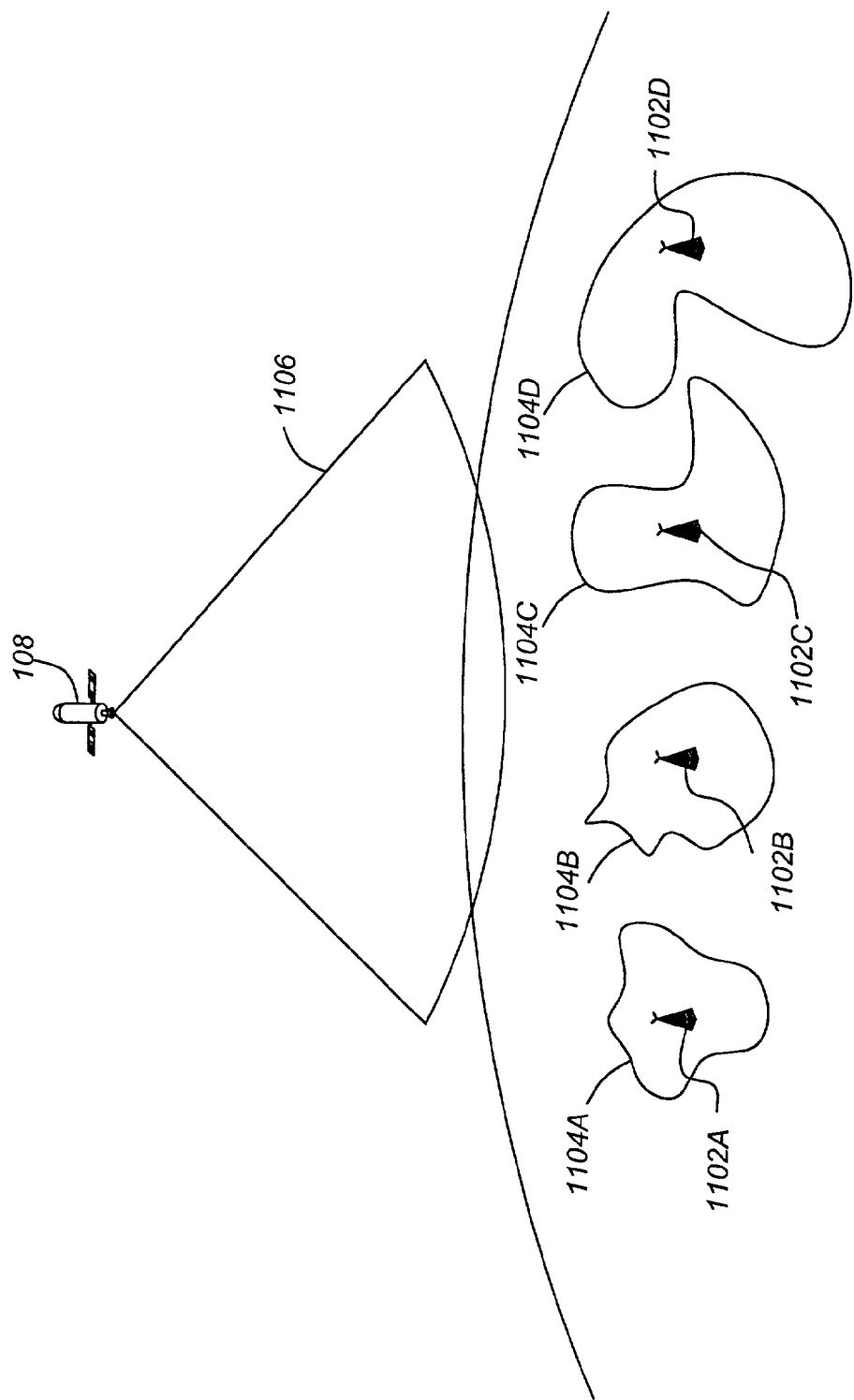
FIG. 11 is a diagram showing the rebroadcasting of local program content to subscribers within market areas serviced by the originating broadcast provider.

FIG. 11 is a diagram showing the rebroadcasting of local program content to subscribers within market areas serviced by the originating broadcast provider. Local content is broadcasted via terrestrially-based antennae 1102A-1102D to viewers within the market regions 1104A-1104D, respectively. The market regions 1104A-1104D are typically defined as geographical regions wherein the quality of the signal broadcast by the terrestrially-based antennae 1102A-1102D is sufficient to provide a minimal quality signal for viewing. The asymmetric shape is due to terrestrial conditions such as mountains and/or buildings, and the shape of the market regions 1104A-1104D may change based on other variables. Satellite 108 broadcasts a signal having video and/or audio programs and data to the market regions 1104A-

1104D. The signal 1106 can be sent using any combination of satellite 108 coverage areas, including spot beams covering a single market region (e.g. 1104A), regional beams covering more than one market region, and CONUS beams.

Figure 12A:
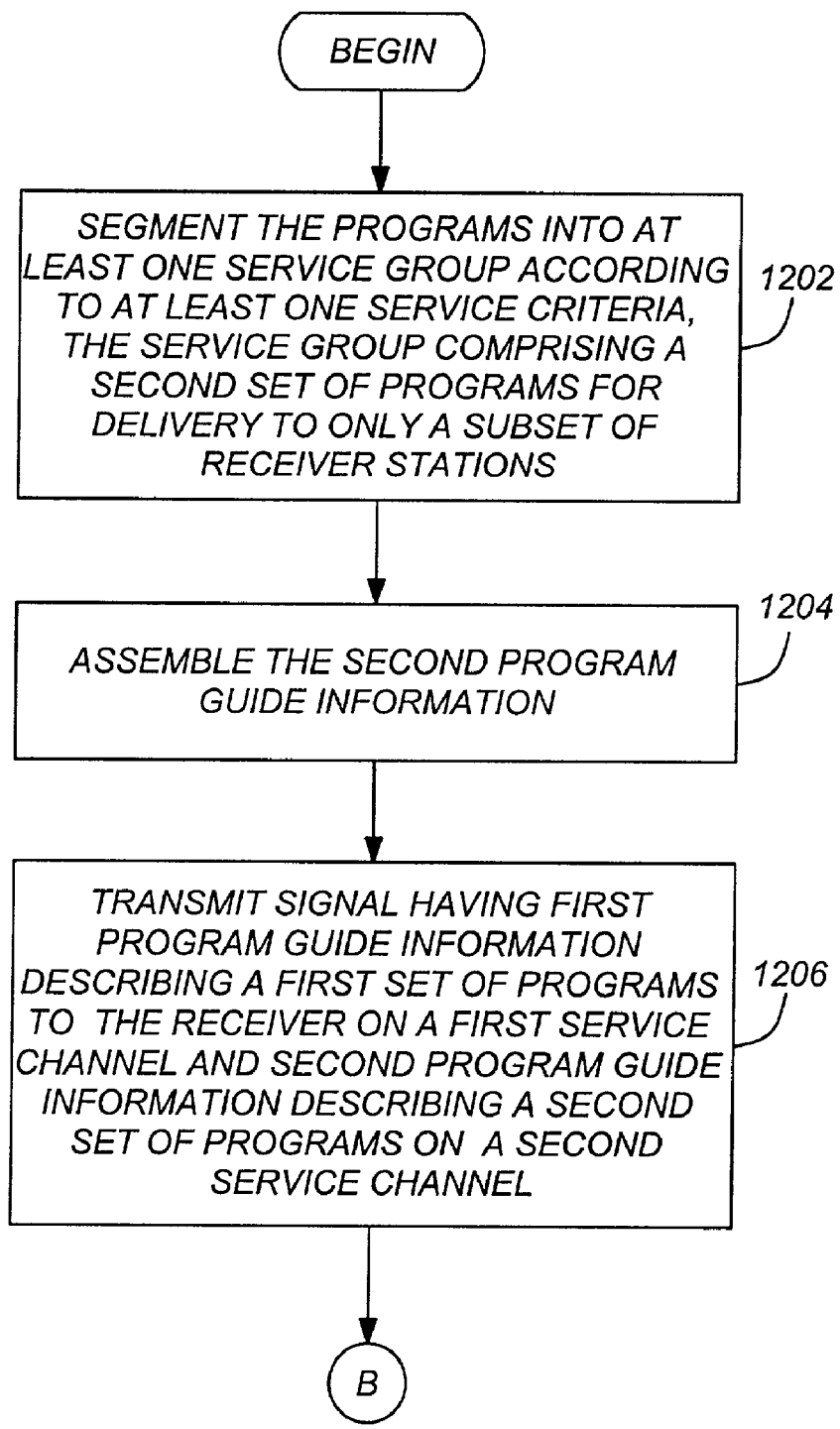
FIGS. 12A and 12B are flow charts illustrating exemplary method steps used in providing programming guide information describing local content to subscribers.
Figure 12B:
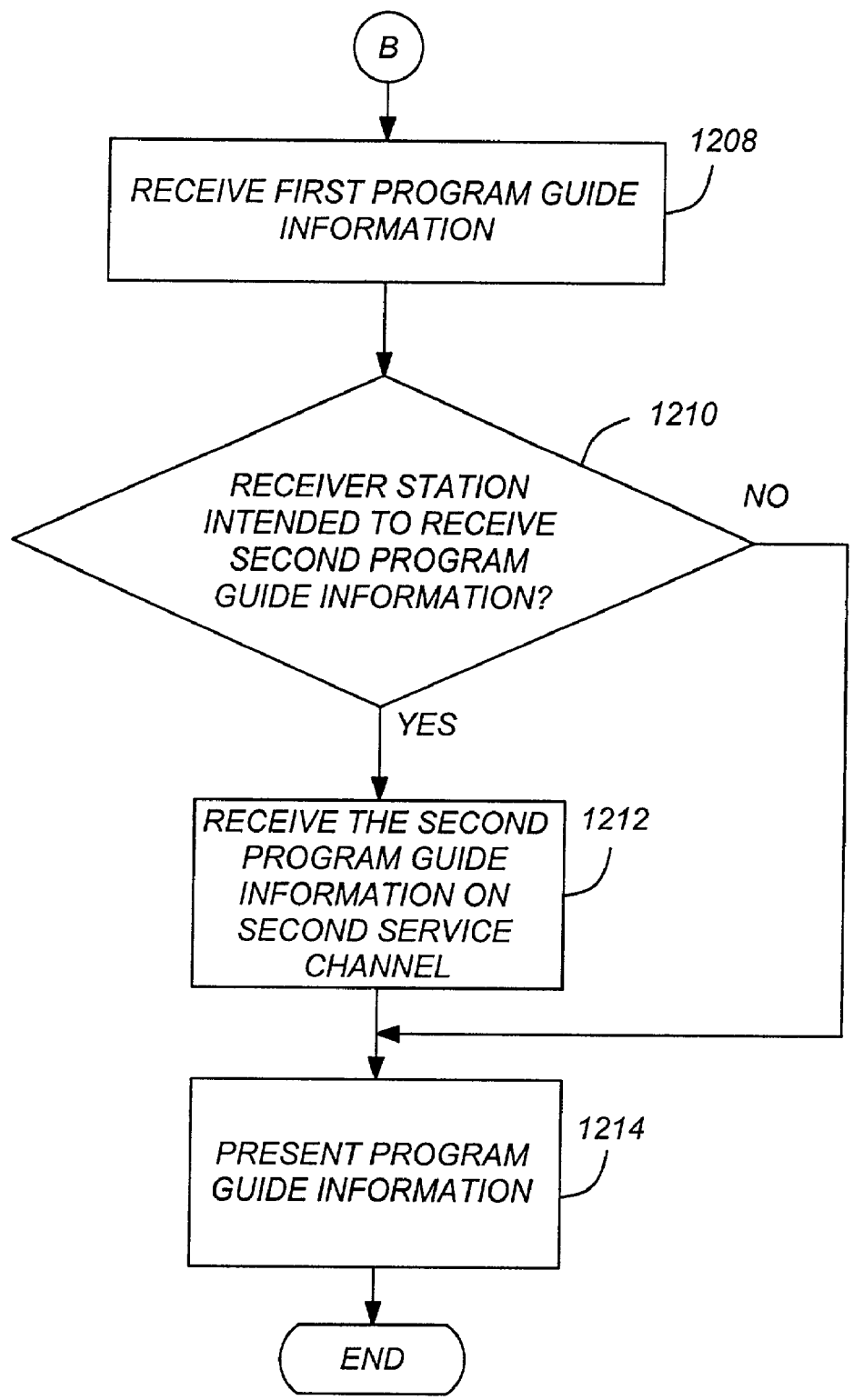

FIGS. 12A and 12B present flow charts illustrating exemplary method steps used in providing programming guide information describing local content (e.g. market program guides) to subscribers 122. The programs broadcast by the satellite video distribution system 100 are segmented or allocated into one or more service groups according to one or more service criteria. This is illustrated in block 1202. The task of segmenting the programs into service groups can be accomplished by the compiler 304 or similar device.

Each program in a particular service group satisfies the service criteria in question. In one embodiment, the service criteria is based on geographic boundaries. That is, programs in the service group are those which are designated to be received by subscribers 122 having receiving station equipment located in a particular geographical region (e.g. the Metropolitan Los Angeles area). In another embodiment, the service criteria is based on boundaries defined according to another parameter such as a minimum quality of service (QoS) in receiving terrestrially transmitted broadcasts from local content providers. In this case, for example, programs in this service group include those which are designated to be received by subscribers 122 having receiving station equipment located in a particular market area (such as, for example, market area 1104A). In another embodiment, the service criteria is based on political boundaries. In this case, programs in a particular service group includes those which are designated to be received within a particular city, county, state, country, or other politically-defined area.

In another embodiment, the programs are categorized into service groups according to program type (e.g. professional sports, home improvement, documentaries, etc.). This categorization allows specialized program guides to be only received by subscribers who are interested in the subject matter of the service group.

In another embodiment, the programs are categorized into service groups according to the services requested by the subscriber. For example, programs which are available to subscribers which have requested pay-per-view service can be categorized into a program service group. Further, subgroups may be defined in which a particular group is further segmented into subgroups according to additional criteria. For example, within a pay-per-view group, programs can be segmented in action, drama, or children's programs. Service groups may also comprise programs meeting a logical combination of different service criteria. For example, a service group can be defined according to both a market area and a program type (e.g. a market area of Southern California or Hawaii and a program category professional surfing, or, a program category of professional surfing, and not a market area of Minneapolis). Data mining and other techniques can be used to identify optimal program service groups which minimize overlap (and thus minimize the redundant broadcasting of multiple program guides with many of the same programs).

Returning to FIG. 12A, the second program guide information, which includes information describing the programs satisfying the service criteria is assembled. This is illustrated in block 1204. The task of assembly can be performed by the compiler 304 or a separate device. A signal is transmitted via one of the satellites in the video distribution system 100 to the receiving stations 110, as shown in block 1206. The signal includes a plurality of service channels, each designated by a service channel identifier or SCID. The program guide information referring to those programs complying with the service criteria are transmitted to the receiver stations 110 on a service channel that differs from the service channel that is used to transmit program guide information for all receiver stations 110.

Referring again to FIG. 7, for example, SCID 9 716 is used to transmit the program guide information for programs allocated to all subscribers (a "baseline" program guide). Program guide information for a selectable number of programs can be included in this baseline program guide information. Another number of channels can be reserved for service groups defined by one or more subscriber criteria (such as sharing the same market area, viewer preferences, etc.). In one embodiment, the number of channels described by the baseline program guide is about 300 and the number of channels described by the second program guide is 100 channels. These numbers can adaptively change over time to accommodate subscriber 122 requests and program changes, if necessary. Baseline program guide information is provided on SCID 9 716, and second program guide information is provided in SCIDs 0x50A 724 through 0x522 726. In the embodiment illustrated in FIG. 7, each of the market program guides illustrated includes program guide information for four channels. Twenty-five market program guides are provided, thus providing information on 100 channels. The market program guide can also be acquired from a base SCID that can be computed from the Market ID. For example, the SCID for the market MPG can be determined as a simple sum of a base SCID and the Market ID. Other functional combinations of the base SCID and the Market ID can be used to define the SCID for the market program guide as well.

As shown in FIG. 7, each of the satellites in a multiple satellite video distribution system broadcasts the same program guide information on SCIDs 0x50A 724 through 0x522 726. The repetition of market program guides on additional service networks serves to allow the principle of Foreign MPGs to be applied to the enhanced IRD 614. For example, "Market 1" may be directed to subscribers 122 in the Los Angeles area, and one or more of the satellites in the satellite network could be used to provide a spot beam to the Los Angeles area providing program material and program guide information. In this case, "Market 1" information may be provided to subscribers 122 in the Los Angeles area, and the same information need not be repeated on other networks.

Turning to FIG. 12B, if the receiver station 110 is intended to receive the second program guide information, the information is received, a program guide is assembled, and the first and second program guide information is presented to the subscriber 122, as shown in blocks 1208-1214. In one embodiment, the program guide presented to the subscriber 122 is an integrated program guide comprising both the second program guide information and program guide information describing programs that are generally available (e.g. the first program guide).

Several methods can be employed to determine whether the receiver station 110 is intended to receive the second program guide information. In one embodiment, this is accomplished via data stored in the access card 512, such as the billing number. This technique is especially useful in situations where the service criteria is geographical, political, or based on a particular QoS. In another embodiment, this is accomplished via data that is transmitted to the IRD 500 at the receiving station 110. The data can be transmitted over a landline such as link 120, or as data in the downlink 118. For example, a market identifier (market ID) can be transmitted to and stored in the IRD 500 or access card 512. The market ID can be compared to a table stored in the receiver 500 or the access card 512. The comparison ultimately provides the information from which the IRD determines whether the second program guide information will be presented to the subscriber 122. In one embodiment, the comparison provides access to the SCID for the service channel on which the second program guide information is obtained. In another embodiment, second program guide information is retrieved regardless of the market ID, but the second program guide information is only presented to the subscriber if the comparison is successful.

As described above, the service criteria used to determine program groups can be determined from information that is provided by the subscriber 122. This information can include, for example, a request to be provided with program guide information relating to subject category or other criteria.

Typically, the foregoing steps are performed at the receiver station 110 and within the IRD 500 by the microcontroller 510, the tuner 504, and transport chip 508.

Figure 13:
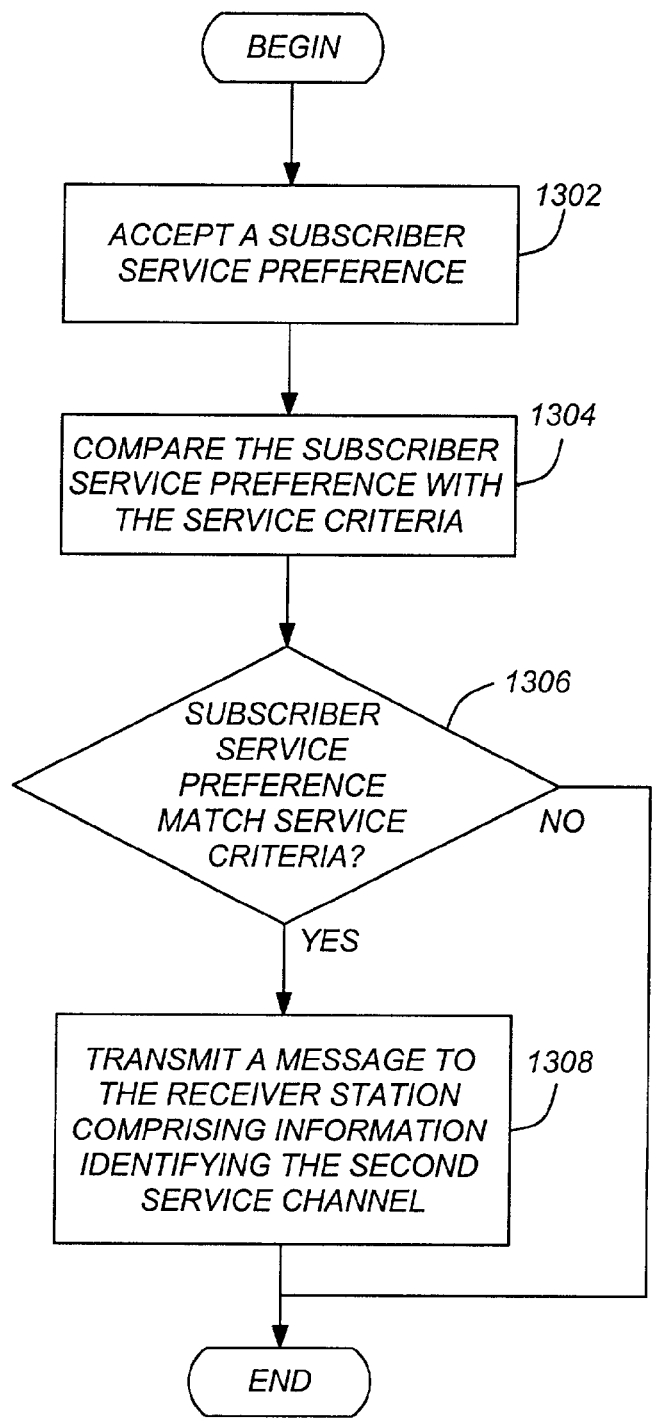
FIG. 13 is a flow chart showing exemplary method steps used to accept subscriber preferences and to configure the subscriber's receiver to receive the requested program guide information.

FIG. 13 is a flow chart showing exemplary method steps used to accept subscriber 122 preferences and to configure the subscriber's 122 IRD 500 to receive the requested program guide information. A subscriber service preference is accepted, as shown in block 1302. This preference can be transmitted from the subscriber via link 120 or other suitable link. Subscriber service preferences are then compared to the service criteria for the service groups, as shown in block 1304. If the subscriber service preference matches the service criteria used to define a particular program group, a message is transmitted to the IRD 500. The message includes information identifying the service channel having the second program guide information. In another embodiment of the present invention, the message transmitted to the IRD 500 is any message including information that can be used to enable the reception and presentation of the second program guide information to the subscriber 122.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. In a broadcasting system having a first service network broadcasting a first signal having a first set of program material and first program guide information describing at least a portion of said first set of program material, and a second service network broadcasting a second signal having a second set of program material and second program guide information describing at least a portion of said second set of program material, wherein the first broadcast signal and the second broadcast signal each include service channels uniquely described by a service channel identifier, a method of providing at least a portion of the second program guide information to a receiving station receiving the first signal, comprising the steps of:

mapping at least a portion of the first program guide information to a first service channel of the first broadcast signal;

mapping at least a portion of the second program guide information to a second service channel of the first broadcast signal, wherein the second service channel is logically offset from the first service channel; and transmitting the first signal to the receiving station;

wherein the second program guide information includes data identifying the service network transmitting the second program guide information and wherein the first program guide information and the second program guide information is merged according to a comparison between the data and a receiver station configuration value.

2. The method of claim 1, wherein the second service channel is logically offset by an amount specified in the first program guide information.

3. The method of claim 1, wherein the portion of the second program guide information is transmitted at a different rate than the first program guide information.

4. The method of claim 1, wherein the first program guide information describes program material to be broadcast during a first time period, and the second program guide information describes program material to be broadcast during a second time period.

5. The method of claim 4, wherein the second time period is of different length than the first time period.

6. The method of claim 1, further comprising the steps of:
receiving the first signal; and
storing the first program guide information and the second program guide information for subsequent retrieval.

7. The method of claim 6, further comprising the steps of:
merging the first program guide information and the second program guide information to produce a merged program guide; and
retrieving the merged program guide in response to a subscriber request.

8. In a broadcasting system having a first service network broadcasting a first signal having a first set of program material and first program guide information describing at least a portion of said first set of program material, and a second service network broadcasting a second signal having a second set of program material and second program guide information describing at least a portion of said second set of program material, wherein the first broadcast signal and the second broadcast signal each include service channels uniquely described by a service channel identifier, a method of obtaining at least a portion of the second program guide information via the first signal, comprising the steps of:

receiving the first signal, wherein the first signal includes:
a first service channel having at least a portion of the first program guide information;
a second service channel having at least a portion of the second program guide information;
wherein the second service channel is logically offset from the first service channel; and presenting the first program guide information and the second program guide information to a subscriber;

wherein the second program guide information includes data identifying the service network transmitting the second program guide information and wherein the first program guide information and the second program guide information is merged according to a comparison between the data and a receiver station configuration value.

9. The method of claim 8, wherein the second service channel is logically offset by an amount specified in the first program guide information.

10. The method of claim 8, wherein the portion of the second program guide information is received at a different rate than the first program guide information.

11. The method of claim 8, wherein the first program guide information describes program material to be broadcast during a first time period, and the second program guide information describes program material to be broadcast during a second time period.

12. The method of claim 11, wherein the second time period is of different length than the first time period.

13. The method of claim 8, further comprising the steps of:
storing the first program guide information and the second program guide information for subsequent retrieval.

14. The method of claim 13, further comprising the steps of:
merging the first program guide information and the second program guide information to produce a merged program guide; and
retrieving the merged program guide in response to a subscriber request.

15. In a broadcasting system having a first service network broadcasting a first signal having a first set of program material and first program guide information describing at least a portion of said first set of program material, and a second service network broadcasting a second signal having a second set of program material and second program guide information describing at least a portion of said second set of program material, wherein the first broadcast signal and the second broadcast signal each include service channels uniquely described by a service channel identifier, an apparatus of providing at least a portion of the second program guide information to a receiver station receiving the first signal, comprising:
a program guide subsystem for mapping at least a portion of the first program guide information to a first service channel of the first broadcast signal, and mapping at least a portion of the second program guide information to a second service channel of the first broadcast signal, wherein the second service channel is logically offset from the first service channel; and
a transmitter for transmitting the first signal to the receiver station;
wherein the second program guide information includes data identifying the service network transmitting the second program guide information and wherein the first program guide information and the second program guide information is merged according to a comparison between the data and a receiver station configuration value.

16. The apparatus of claim 15, wherein the second service channel is logically offset by an amount specified in the first program guide information.

17. The apparatus of claim 15, wherein the portion of the second program guide information is transmitted at a different rate than the first program guide information.

18. The apparatus of claim 15, wherein the first program guide information describes program material to be broadcast during a first time period, and the second program guide information describes program material to be broadcast during a second time period.

19. The apparatus of claim 18, wherein the second time period is of different length than the first time period.

20. The apparatus of claim 15, further comprising:
a tuner for receiving the first signal; and
a memory for storing the first program guide information and the second program guide information for subsequent retrieval.

21. The apparatus of claim 20, wherein the program guide subsystem further comprises:
a module for merging the first program guide information and the second program guide information to produce a merged program guide, and for retrieving the merged program guide in response to a subscriber request.

22. In a broadcasting system having a first service network broadcasting a first signal having a first set of program material and first program guide information describing at least a portion of said first set of program material, and a second service network broadcasting a second signal having a second set of program material and second program guide information describing at least a portion of said second set of program material, wherein the first broadcast signal and the second broadcast signal each include service channels uniquely described by a service channel identifier, an apparatus for obtaining at least a portion of the second program guide information via the first signal, comprising the steps:
a tuner for receiving the first signal, wherein the first signal includes:
a first service channel having at least a portion of the first program guide information;
a second service channel having at least a portion of the second program guide information;
wherein the second service channel is logically offset from the first service channel; and
a presentation device for providing the first program guide information and the second program guide information to a subscriber;
wherein the second program guide information includes data identifying the service network transmitting the second program guide information and wherein the first program guide information and the second program guide information is merged according to a comparison between the data and a receiver station configuration value.

23. The apparatus of claim 22, wherein the second service channel is logically offset by an amount specified in the first program guide information.

24. The apparatus of claim 22, wherein the portion of the second program guide information is received at a different rate than the first program guide information.

25. The apparatus of claim 22, wherein the first program guide information describes program material to be broadcast during a first time period, and the second program guide information describes program material to be broadcast during a second time period.

26. The apparatus of claim 25, wherein the second time period is of different length than the first time period.

27. The apparatus of claim 22, further comprising:
a memory for storing the first program guide information and the second program guide information for subsequent retrieval.

28. The apparatus of claim 27, further comprising:
a module for merging the first program guide information and the second program guide information to produce a merged program guide and for retrieving the merged program guide in response to a subscriber request.

29. In a broadcasting system having a first service network broadcasting a first signal having a first set of program material and first program guide information describing at least a portion of said first set of program material, and a second service network broadcasting a second signal having a second set of program material and second program guide information describing at least a portion of said second set of program material, wherein the first broadcast signal and the second broadcast signal each include service channels uniquely described by a service channel identifier, an apparatus for providing at least a portion of the second program guide information to a receiver station receiving the first signal, comprising:

means for mapping at least a portion of the first program guide information to a first service channel of the first broadcast signal;

means for mapping at least a portion of the second program guide information to a second service channel of the first broadcast signal, wherein the second service channel is logically offset from the first service channel; and means for transmitting the first signal to the receiver station;

wherein the second program guide information includes data identifying the service network transmitting the second program guide information and wherein the first program guide information and the second program guide information is merged according to a comparison between the data and a receiver station configuration value.

30. The apparatus of claim 29, wherein the second service channel is logically offset by an amount specified in the first program guide information.

31. The apparatus of claim 29, wherein the portion of the second program guide information is transmitted at a different rate than the first program guide information.

32. The apparatus of claim 29, wherein the first program guide information describes program material to be broadcast during a first time period, and the second program guide information describes program material to be broadcast during a second time period.

33. The apparatus of claim 32, wherein the second time period is of different length than the first time period.

34. The apparatus of claim 29, further comprising:
    means for receiving the first signal; and
    means for storing the first program guide information and the second program guide information for subsequent retrieval.

35. The apparatus of claim 34, further comprising:
    means for merging the first program guide information and the second program guide information to produce a merged program guide; and
    means for retrieving the merged program guide in response to a subscriber request.

36. In a broadcasting system having a first service network broadcasting a first signal having a first set of program material and first program guide information describing at least a portion of said first set of program material, and a second service network broadcasting a second signal having a second set of program material and second program guide information describing at least a portion of said second set of program material, wherein the first broadcast signal and the second broadcast signal each include service channels uniquely described by a service channel identifier, an apparatus for obtaining at least a portion of the second program guide information via the first signal, comprising:

means for receiving the first signal, wherein the first signal includes:
        a first service channel having at least a portion of the first program guide information;
        a second service channel having at least a portion of the second program guide information;
        wherein the second service channel is logically offset from the first service channel; and means for presenting the first program guide information and the second program guide information to a subscriber;

wherein the second program guide information includes data identifying the service network transmitting the second program guide information and wherein the first program guide information and the second program guide information is merged according to a comparison between the data and a receiver station configuration value.

37. The apparatus of claim 36, wherein the second service channel is logically offset by an amount specified in the first program guide information.

38. The apparatus of claim 36, wherein the portion of the second program guide information is received at a different rate than the first program guide information.

39. The apparatus of claim 36, wherein the first program guide information describes program material to be broadcast during a first time period, and the second program guide information describes program material to be broadcast during a second time period.

40. The apparatus of claim 39, wherein the second time period is of different length than the first time period.

41. The apparatus of claim 36, further comprising:
    means for storing the first program guide information and the second program guide information for subsequent retrieval.

42. The apparatus of claim 41, further comprising:
    means for merging the first program guide information and the second program guide information to produce a merged program guide; and
    means for retrieving the merged program guide in response to a subscriber request.

\* \* \* \* \*